United States Patent [19]

Stern

[11] Patent Number: 4,736,365
[45] Date of Patent: Apr. 5, 1988

[54] METHOD AND APPARATUS FOR CONTROLLING ACCESS TO AN ASYNCHRONOUS COMMUNICATION NETWORK

[75] Inventor: Richard M. Stern, Santa Clara, Calif.
[73] Assignee: Dialogic Systems Corporation, San Jose, Calif.
[21] Appl. No.: 665,416
[22] Filed: Oct. 26, 1984
[51] Int. Cl.[4] .............................................. H04J 3/02
[52] U.S. Cl. ........................................ 370/85; 370/67
[58] Field of Search ...................... 370/85, 67, 24, 29, 370/84

[56] References Cited

U.S. PATENT DOCUMENTS

| | | | |
|---|---|---|---|
| 4,370,743 | 1/1983 | Moran | 370/67 |
| 4,441,162 | 4/1984 | Lillie | 370/85 |
| 4,530,093 | 7/1985 | Akram et al. | 370/85 |

Primary Examiner—Douglas W. Olms
Assistant Examiner—Wellington Chin
Attorney, Agent, or Firm—Townsend and Townsend

[57] ABSTRACT

A method and apparatus for communication circuit acquisition in an information processing system for high throughput communication of digital information is disclosed. High throughput is achieved by providing acquire logic circuitry for acquiring a communication circuit among a multiplicity of communication circuits, which are preferably four-wire, full duplex bidirectional channels for serial communication of digital information, and by preferably providing full duplex, bidirectional communication of messages at a first rate and half duplex, unidirectional communication of large blocks of data at a second higher rate over the communication circuits. The acquire logic circuitry frees the processor included in a communication controller associated with each information processing element to perform other data processing functions so that the processor is not burdened by monitoring the availability of the communication circuits for transmission of digital information. The method and apparatus facilitate circuit implementation of an architecture for high throughput fault tolerant serial communication of digital information in a loosely coupled information processing system. Other features are also disclosed.

22 Claims, 10 Drawing Sheets

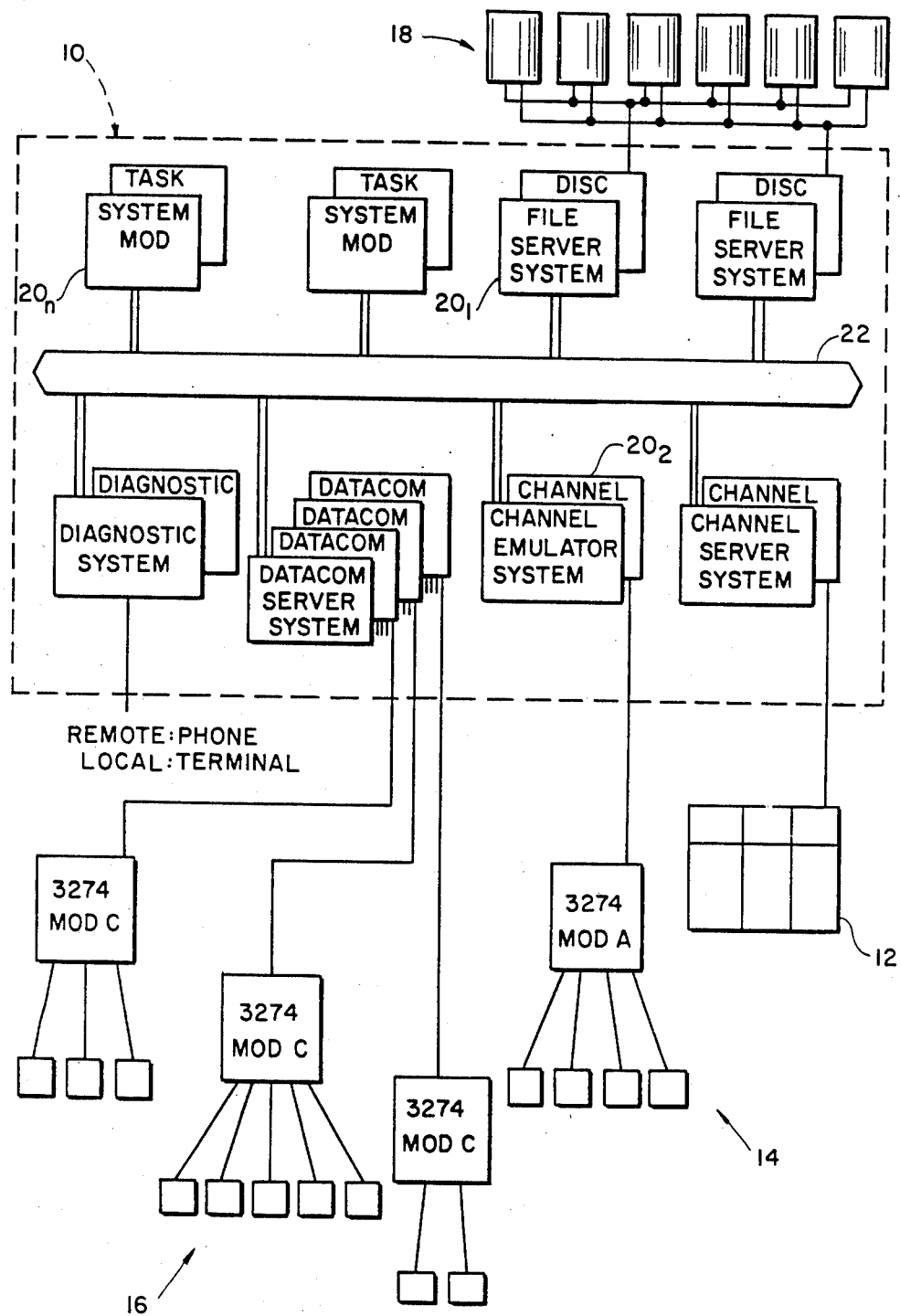
FIG._1.

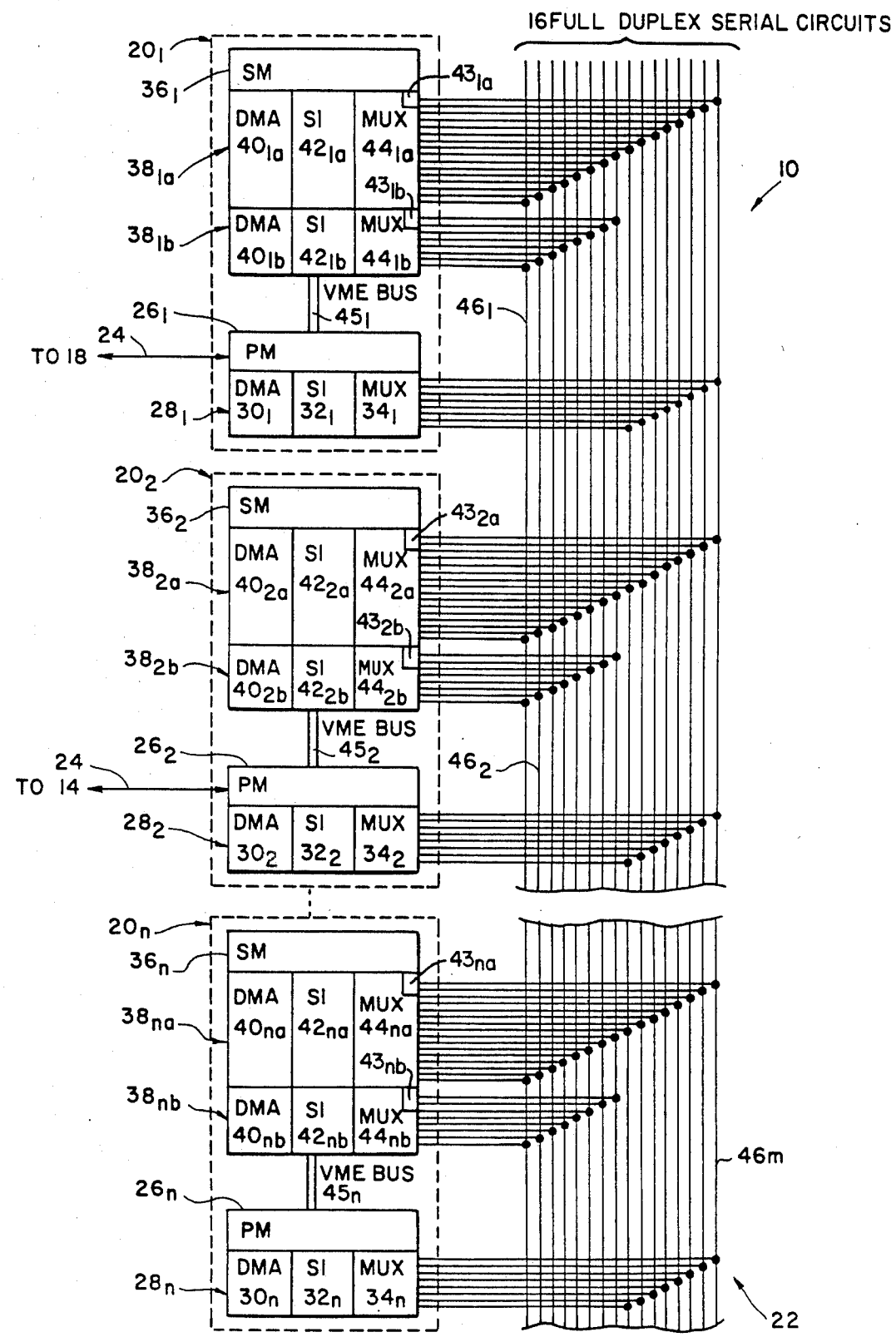
FIG._2.

| FIG. 3A₁ | FIG. 3A₂ | FIG. 3B₁ | FIG. 3B₂ |
|----------|----------|----------|----------|
| FIG. 3A₃ | FIG. 3A₄ | FIG. 3B₃ | FIG. 3B₄ |
| FIG. 3C₁ | FIG. 3C₂ | FIG. 3D₁ | FIG. 3D₂ |
| FIG. 3C₃ | FIG. 3C₄ | FIG. 3D₃ | FIG. 3D₄ |
| FIG. 3E₁ | FIG. 3E₂ | FIG. 3F₁ | FIG. 3F₂ |
| FIG. 3E₃ | FIG. 3E₄ | FIG. 3F₃ | FIG. 3F₄ |
FIG._3.
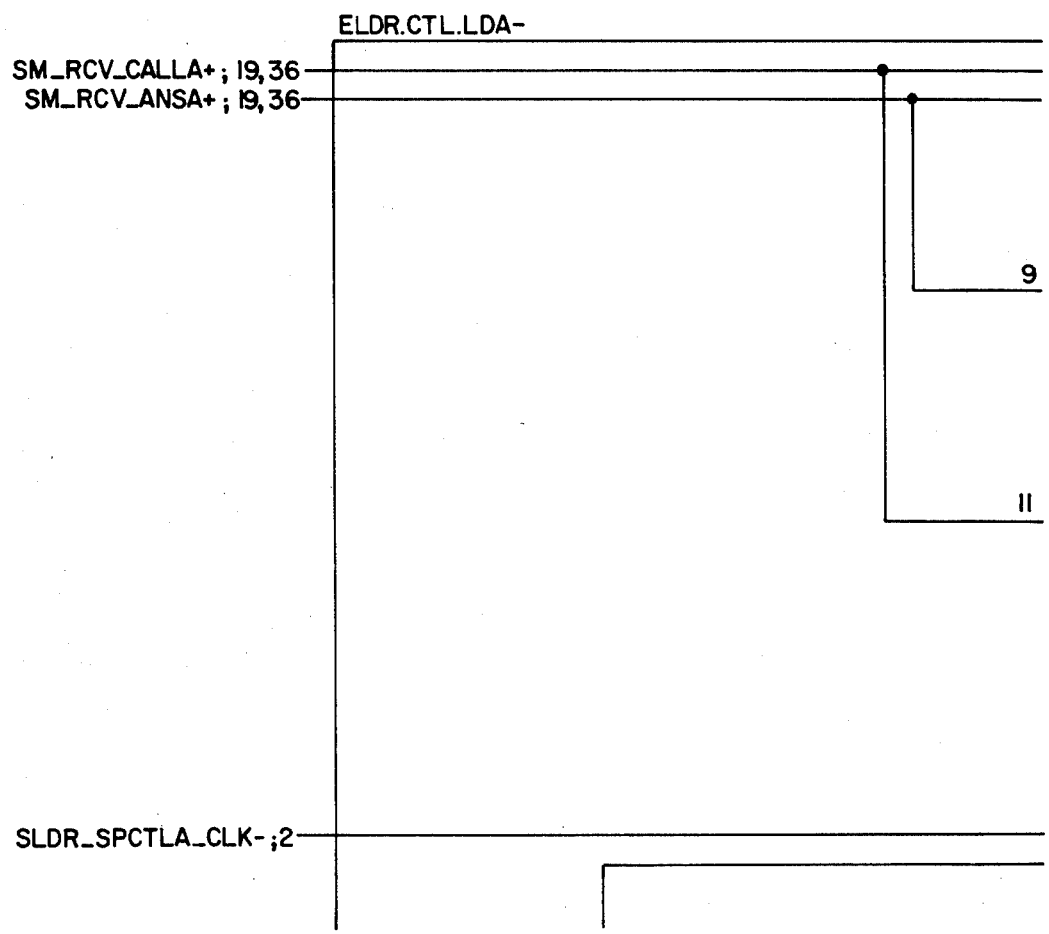
FIG._3A₁.

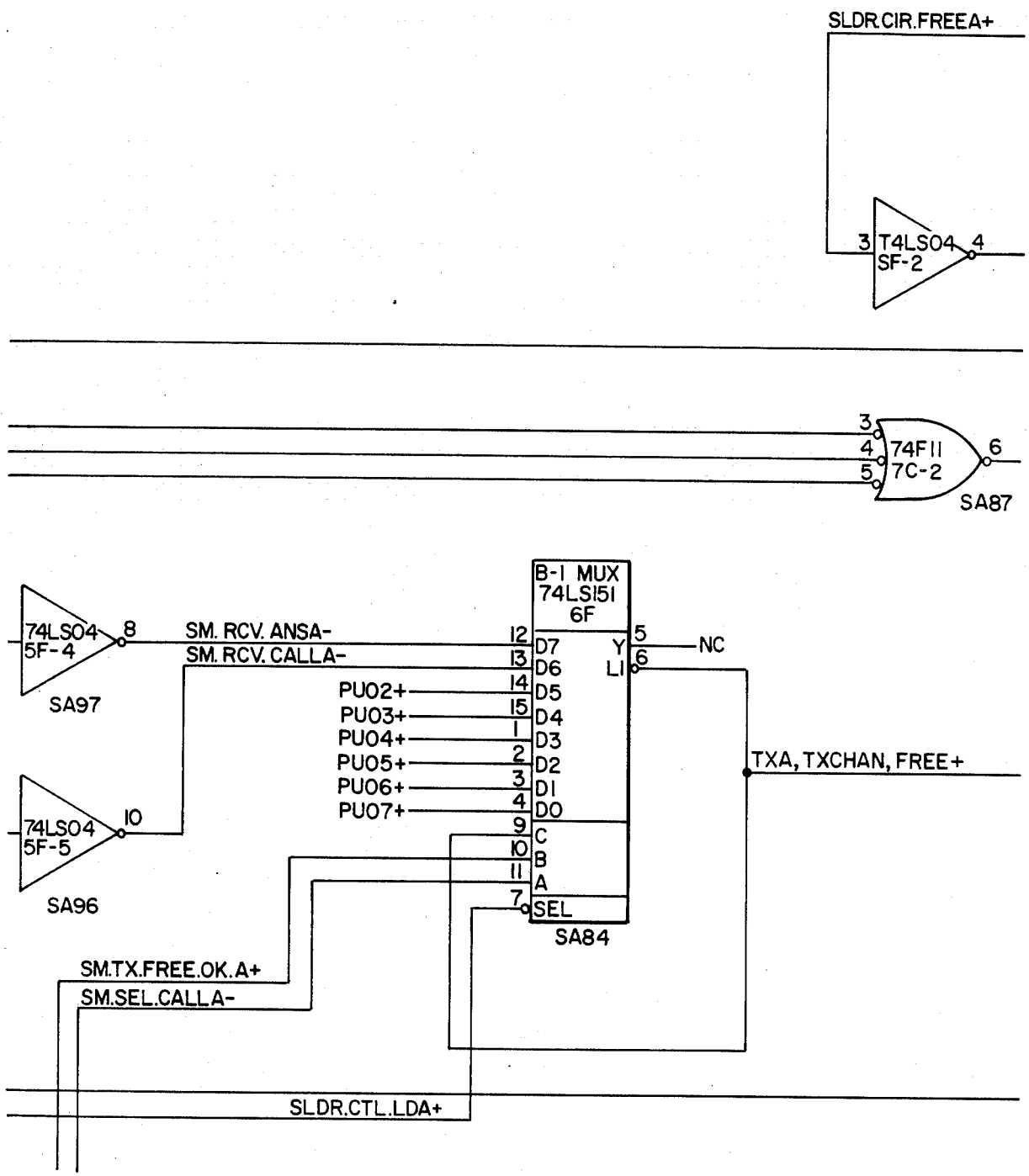
FIG._3A2.

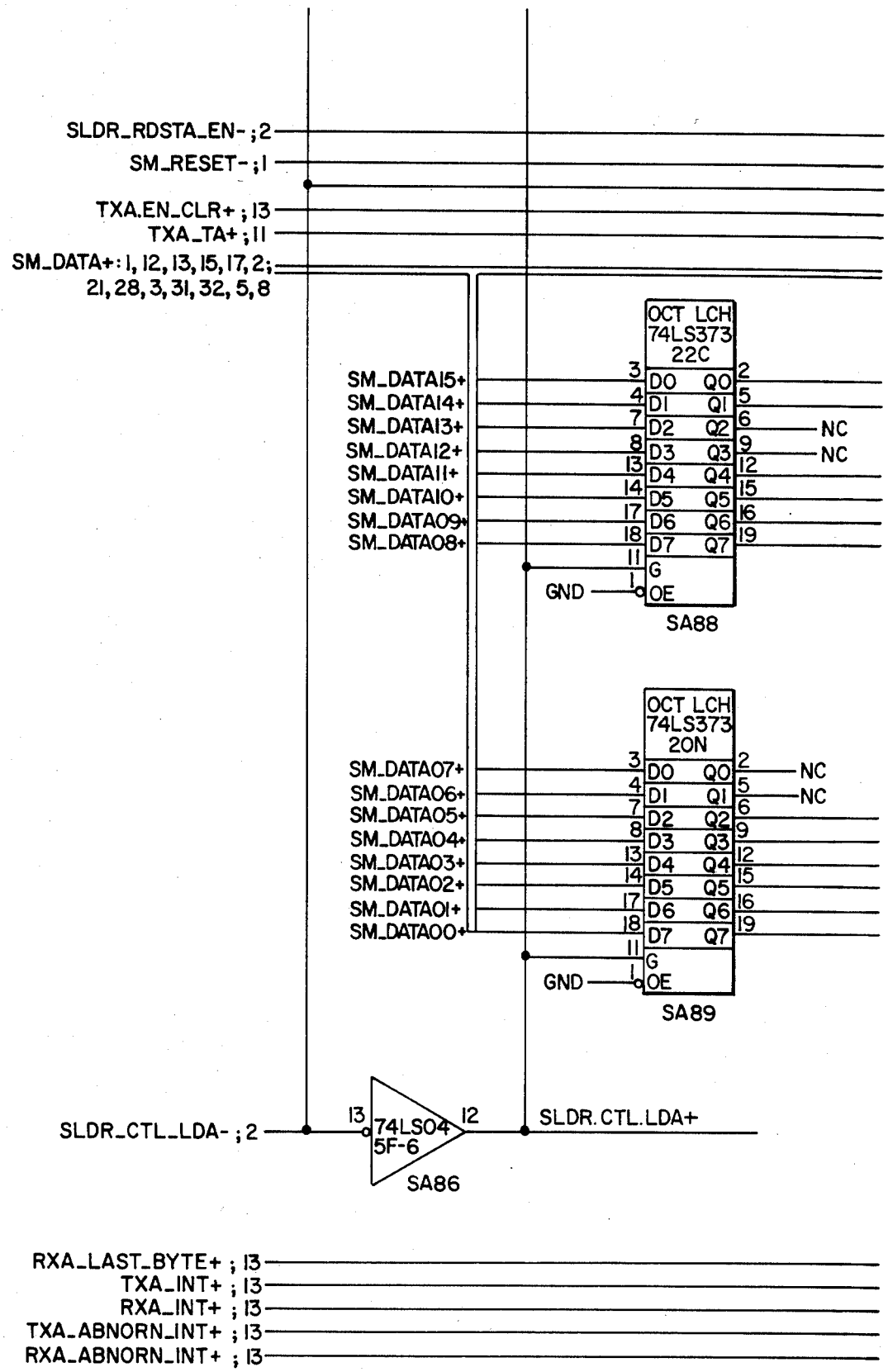
FIG._3A₃.

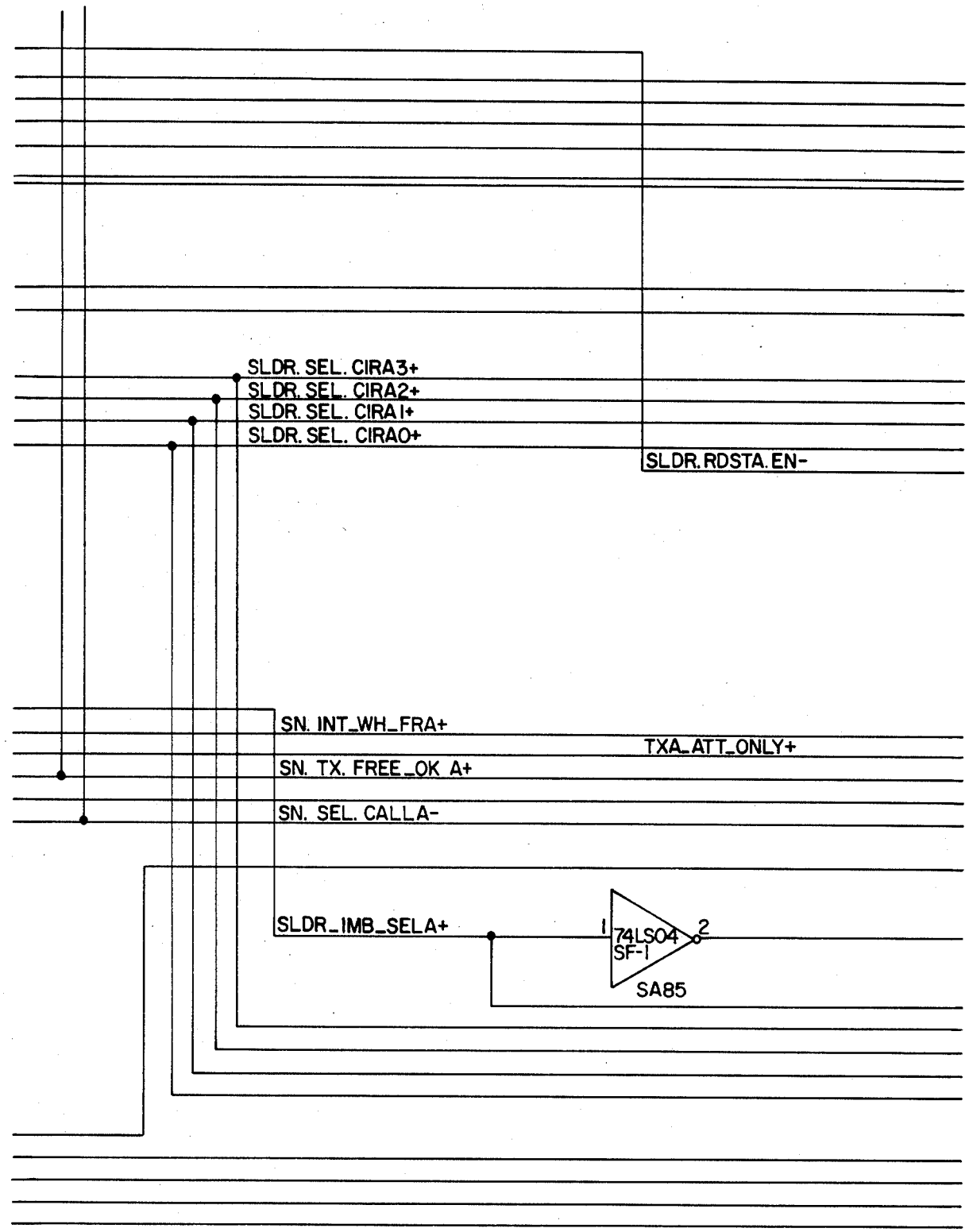
FIG._3A4.

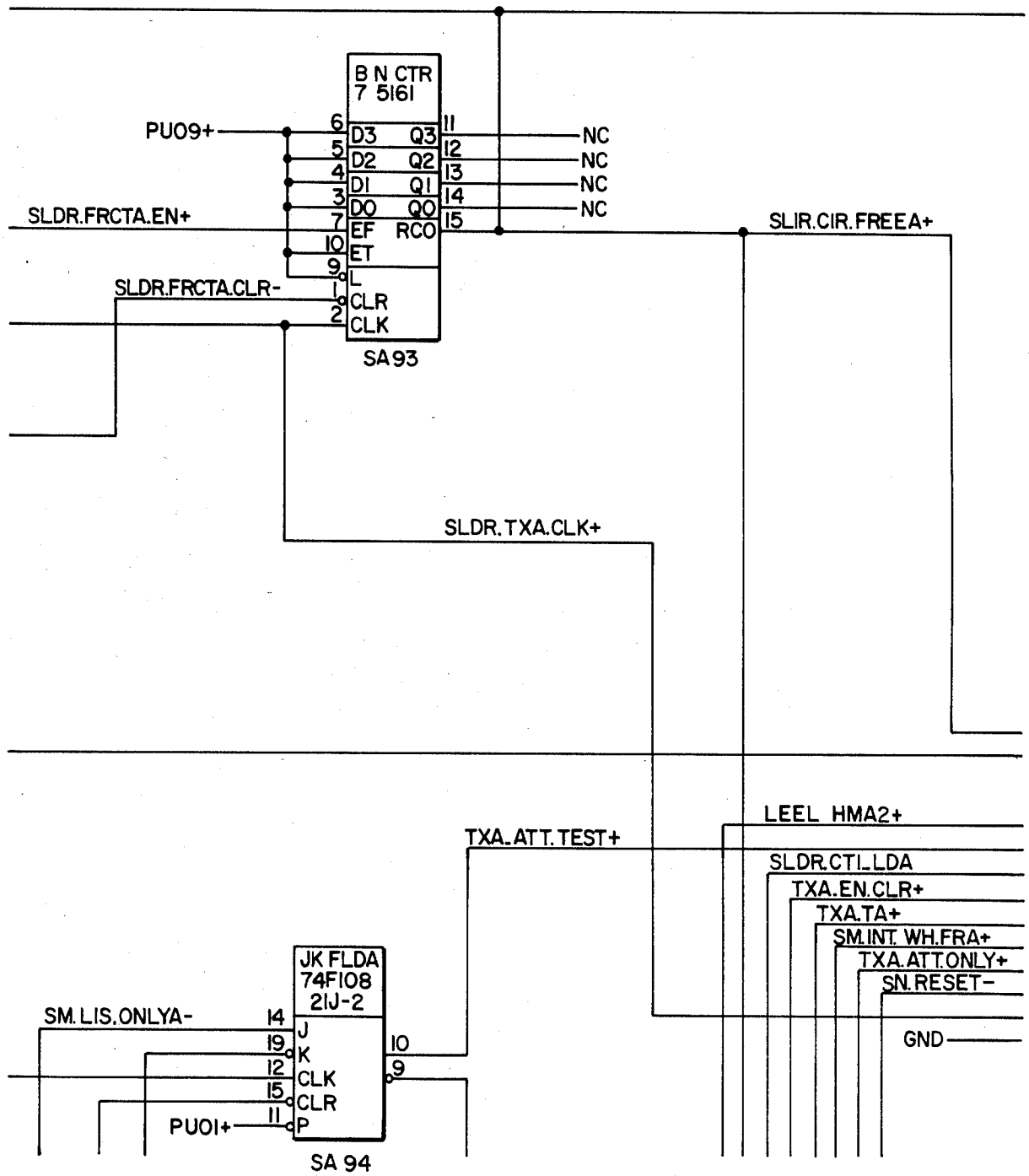
FIG.__3B₁.

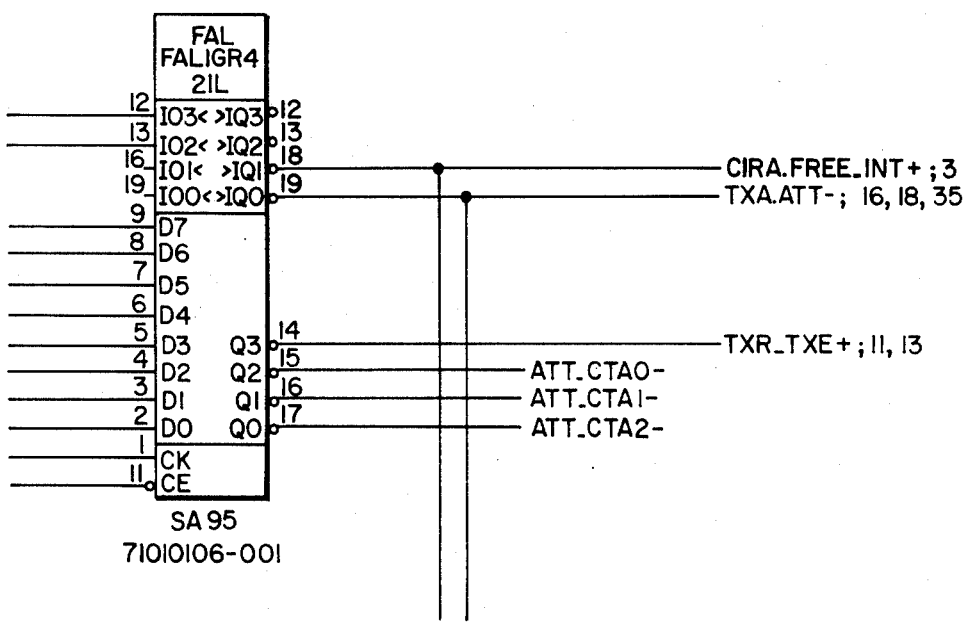
FIG._3B2.

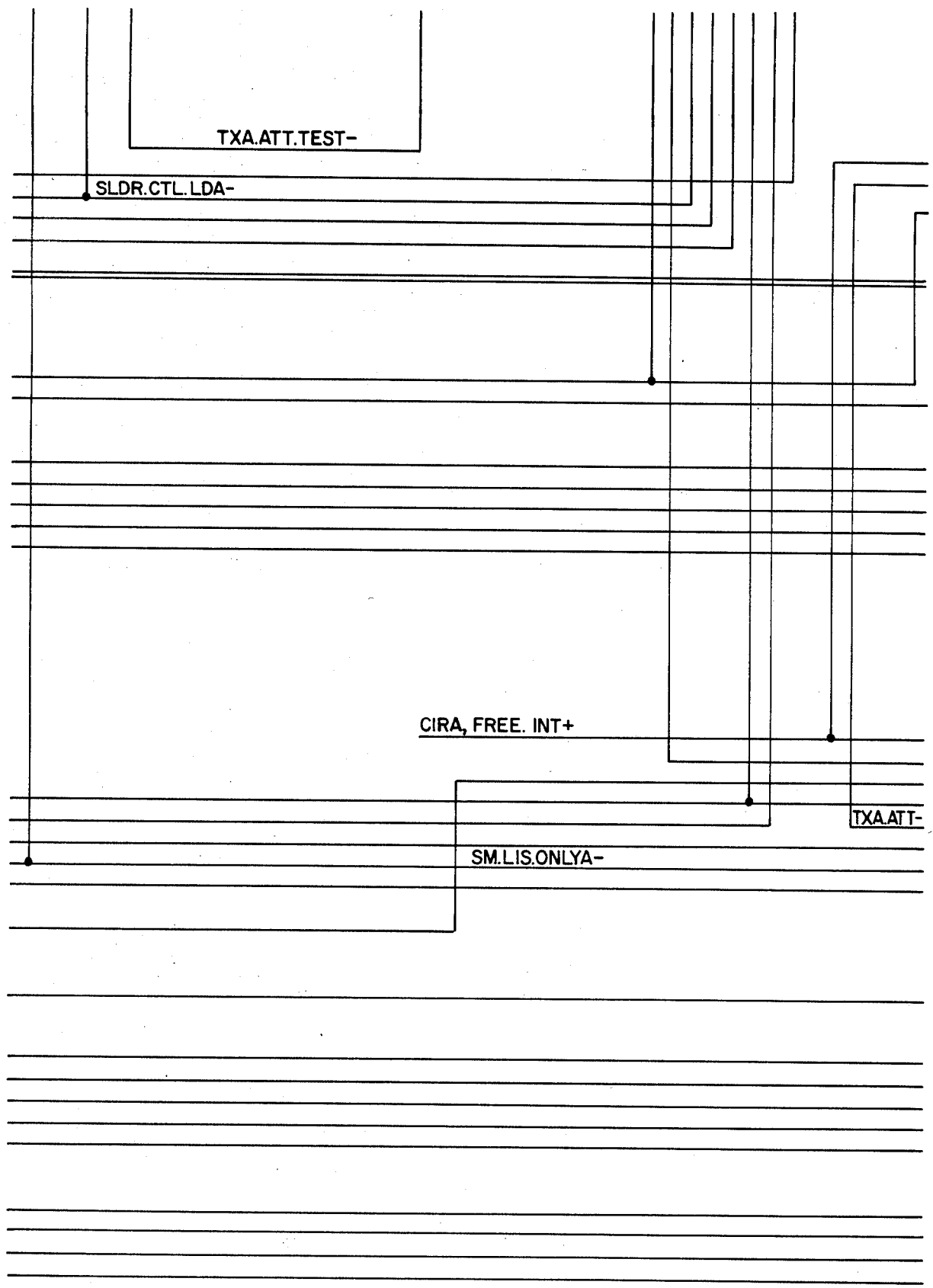
FIG._3B3.

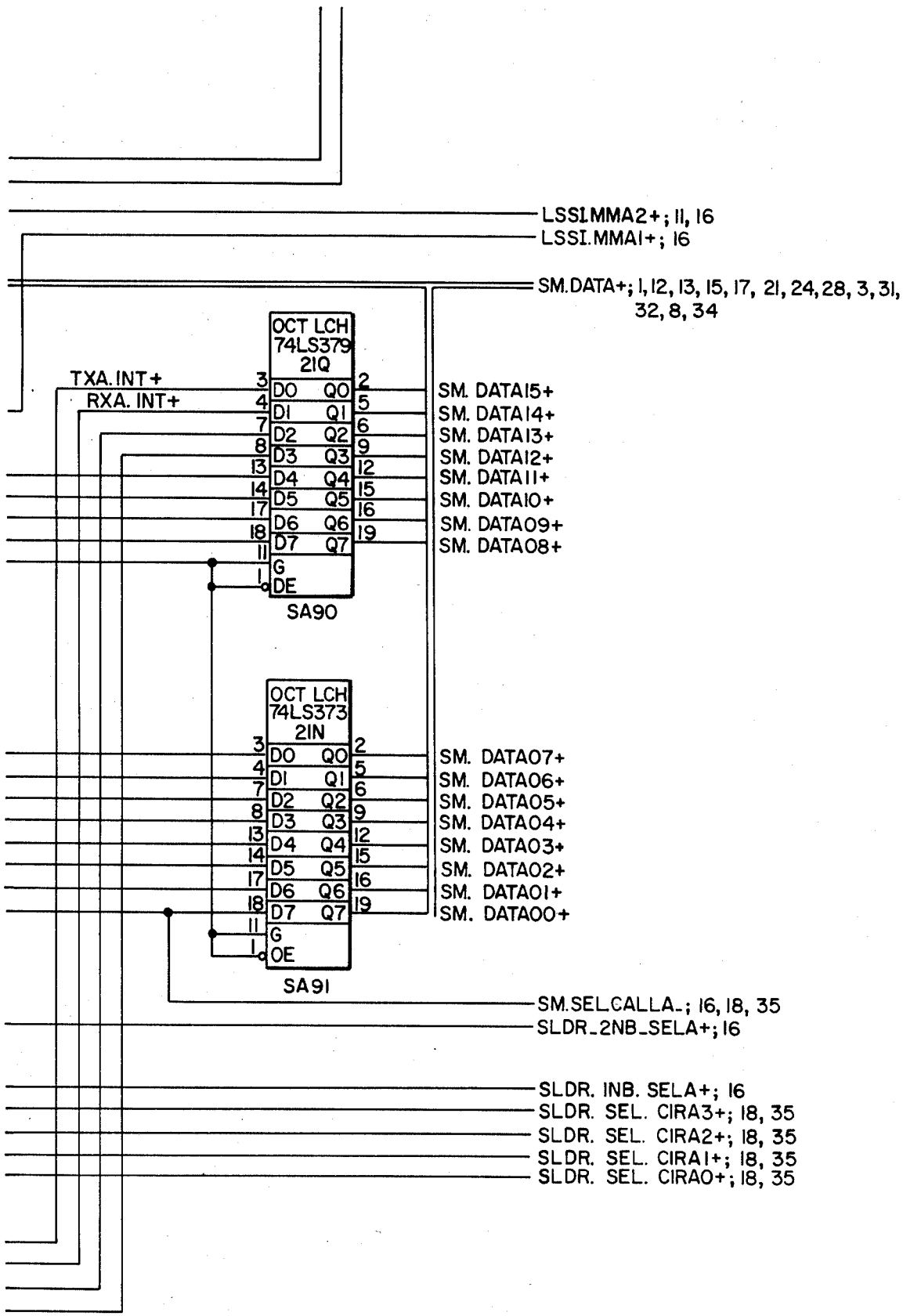
FIG._3B4.

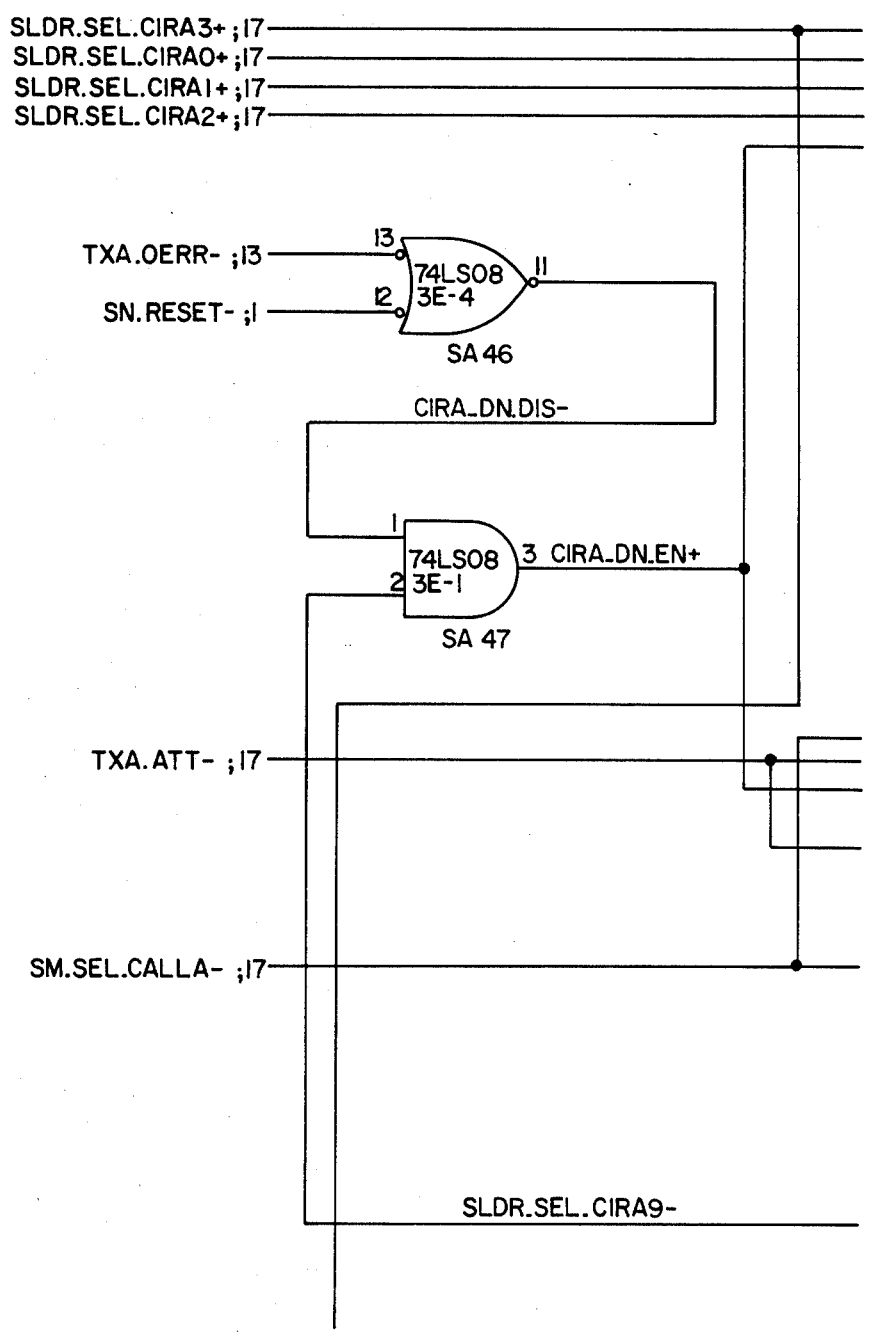
FIG._3C₁

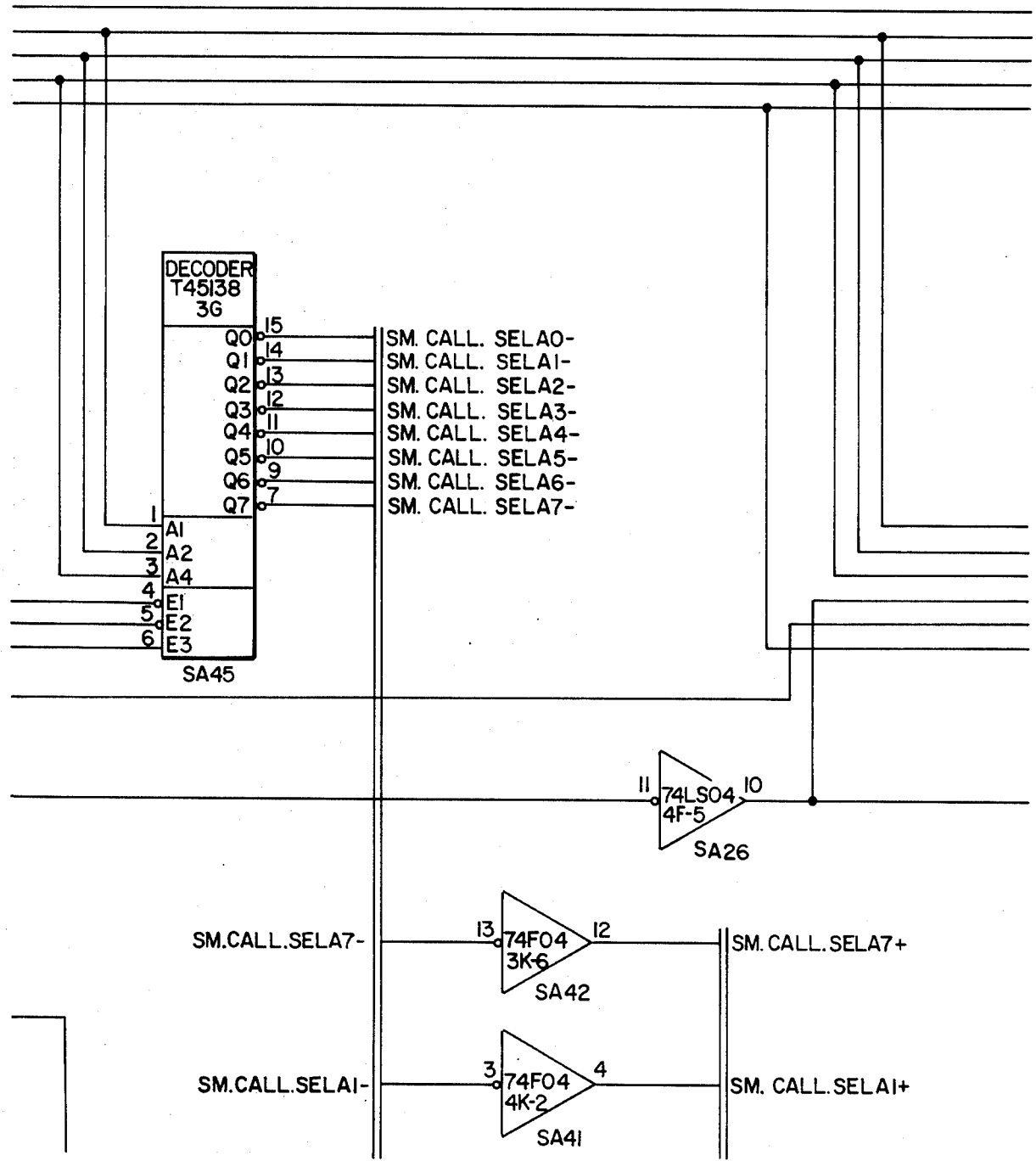
FIG._3C₂.

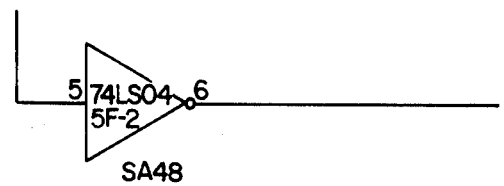
FIG._3C3.

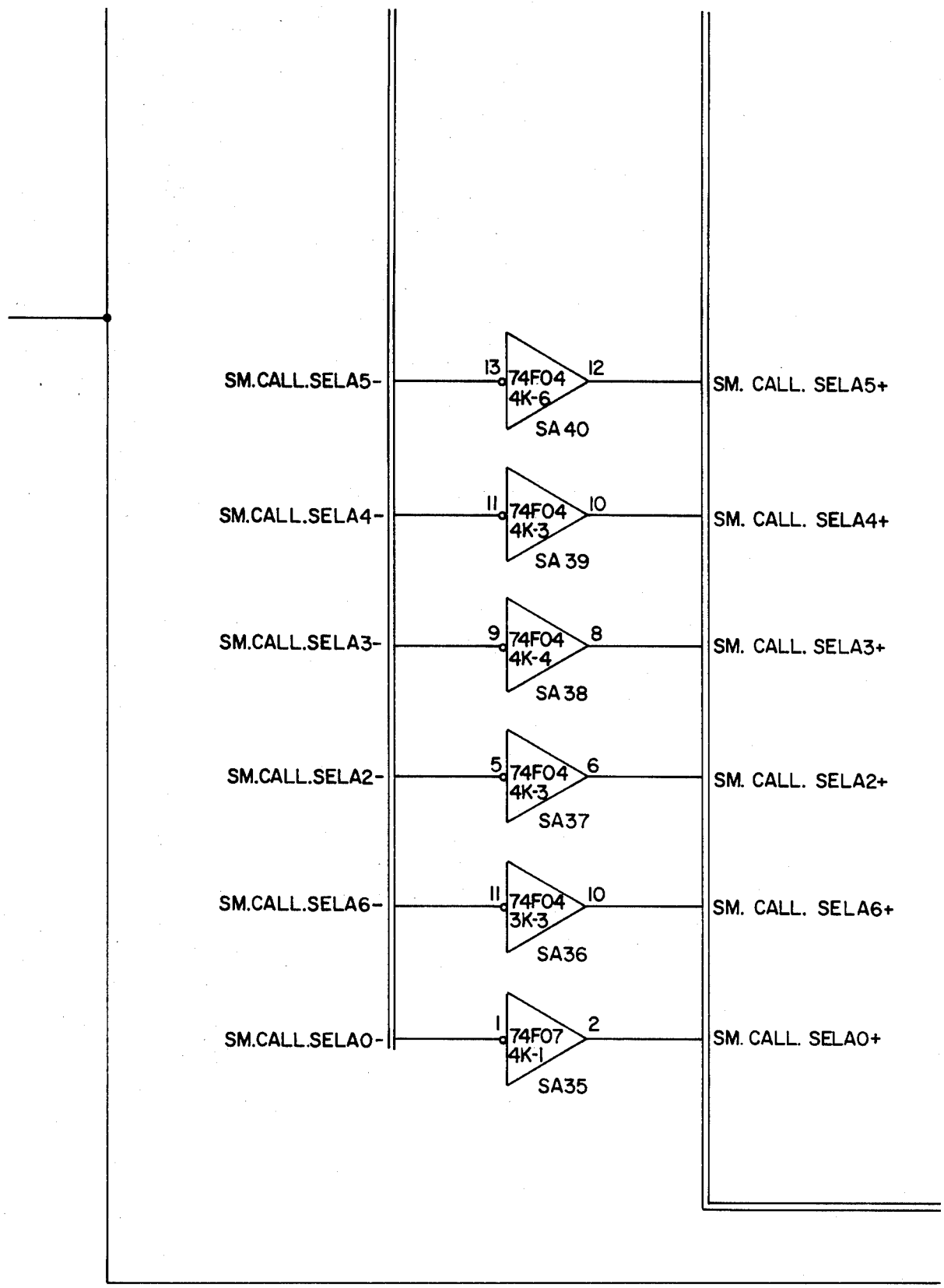
FIG.–3C4.

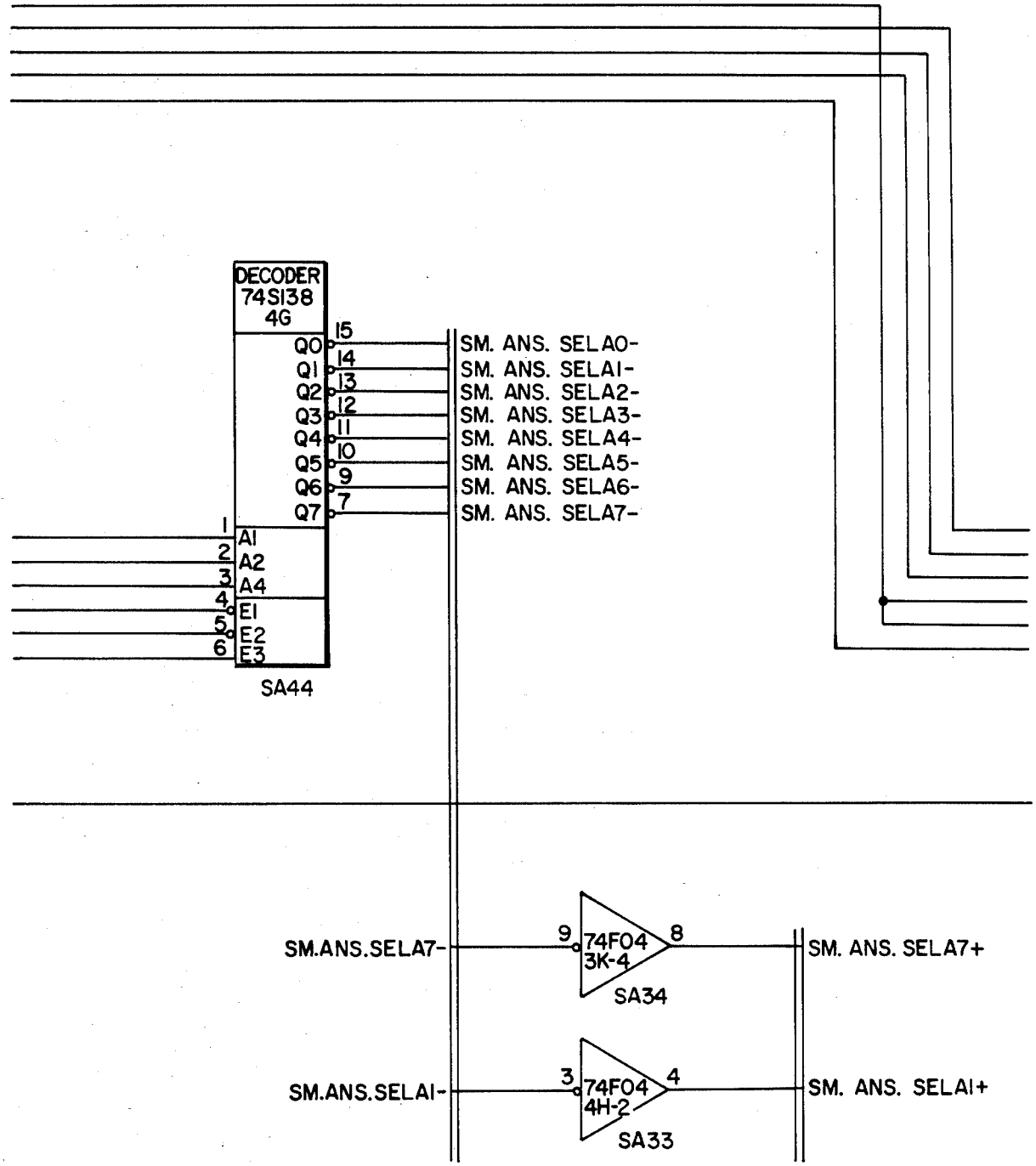
FIG._3D₁

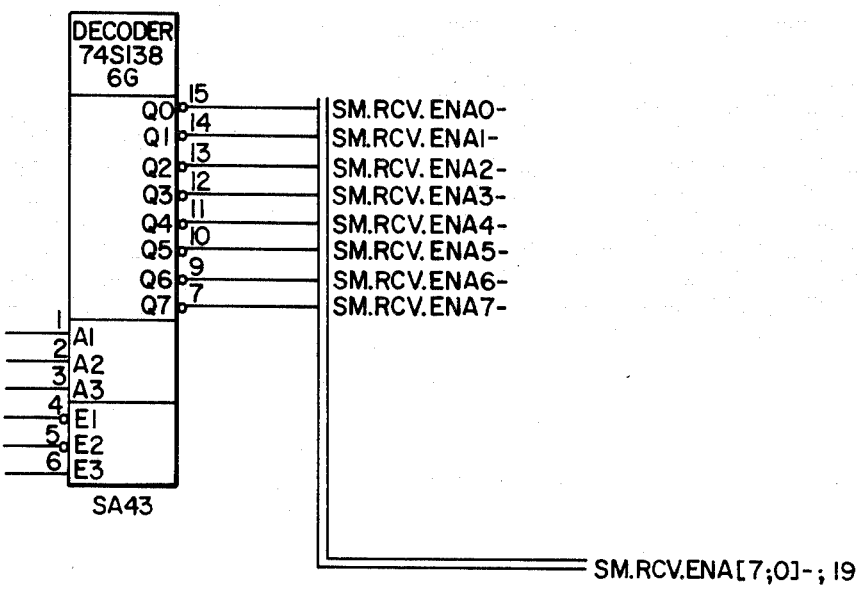
FIG._3D2.

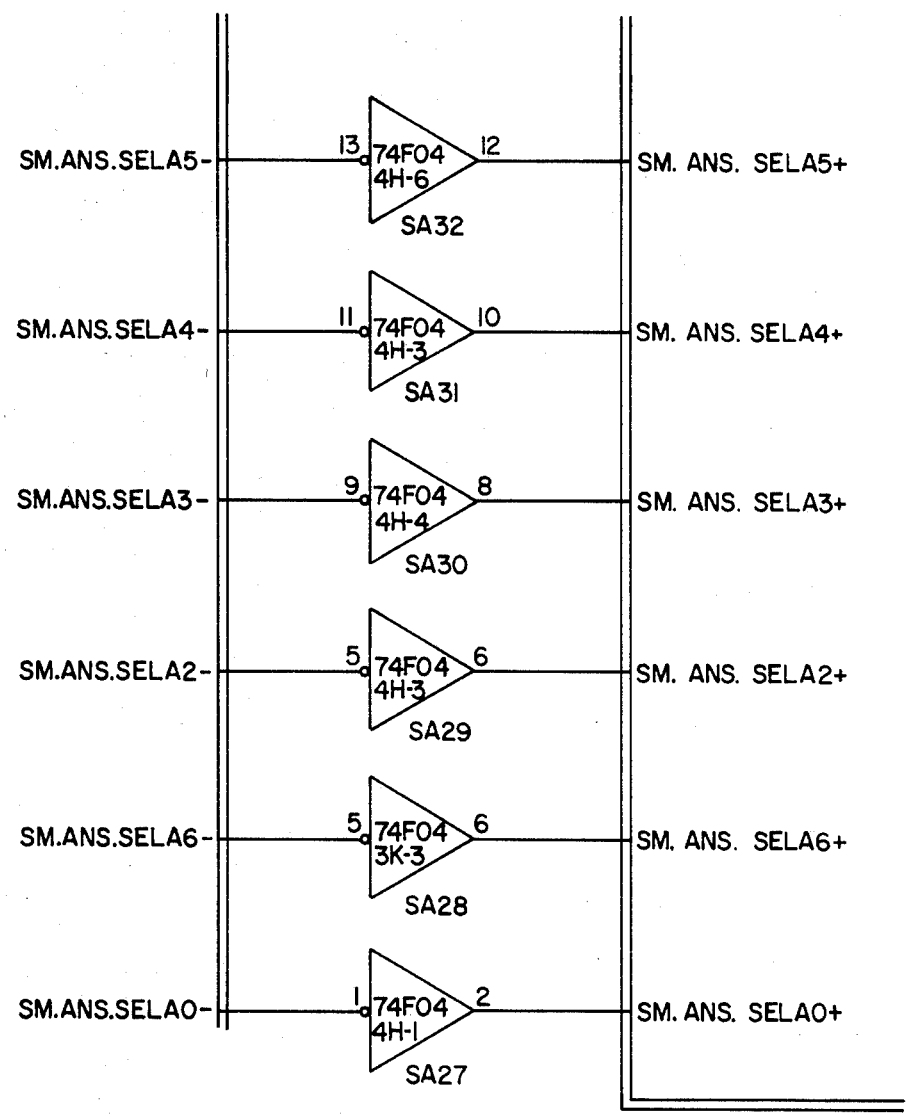
FIG._3D3.

SM.ANS.SELA[7:0]+;19

SN.CALL.SELA[7:0]+;19

SLDR.SEL.CIRA3-;35

FIG._3D4.

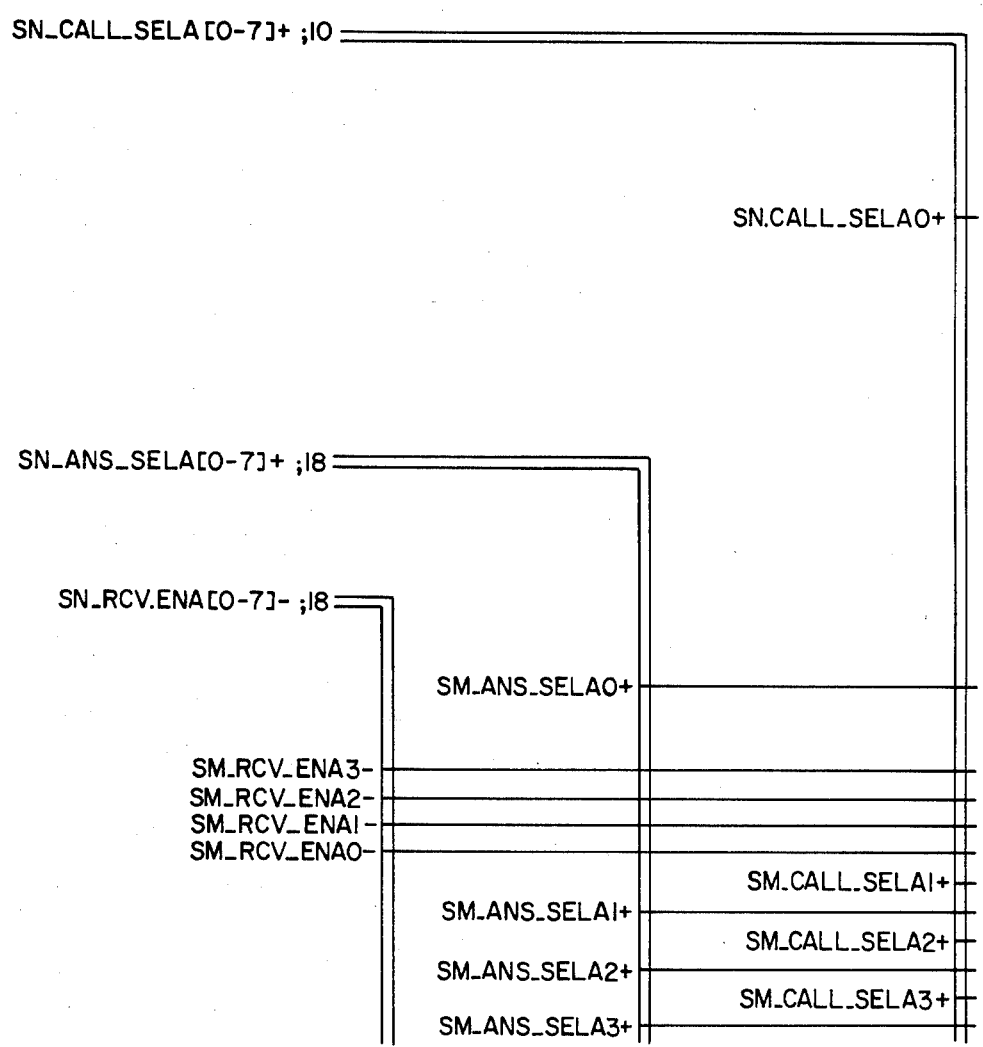
FIG._3E₁

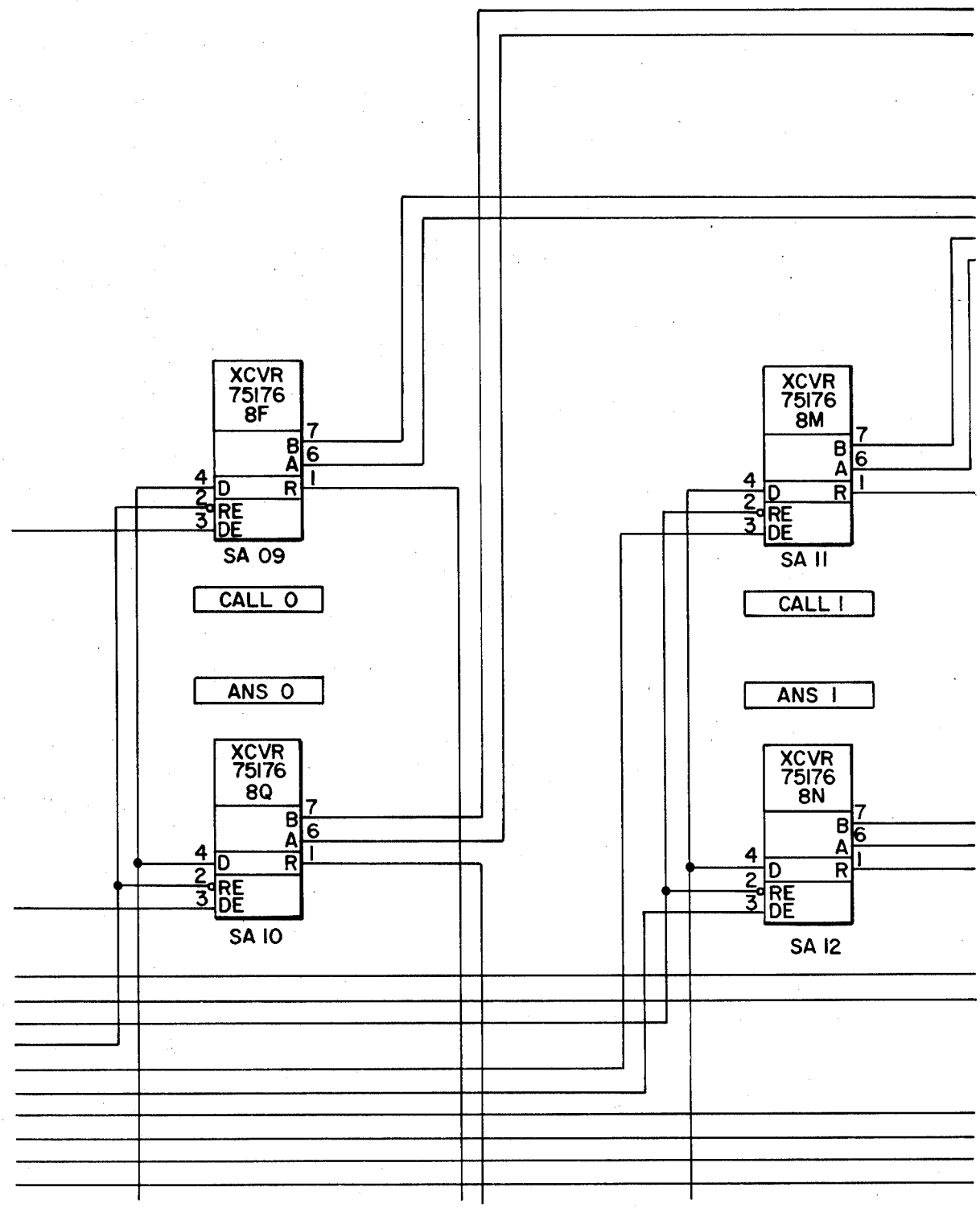
FIG.—3E₂.

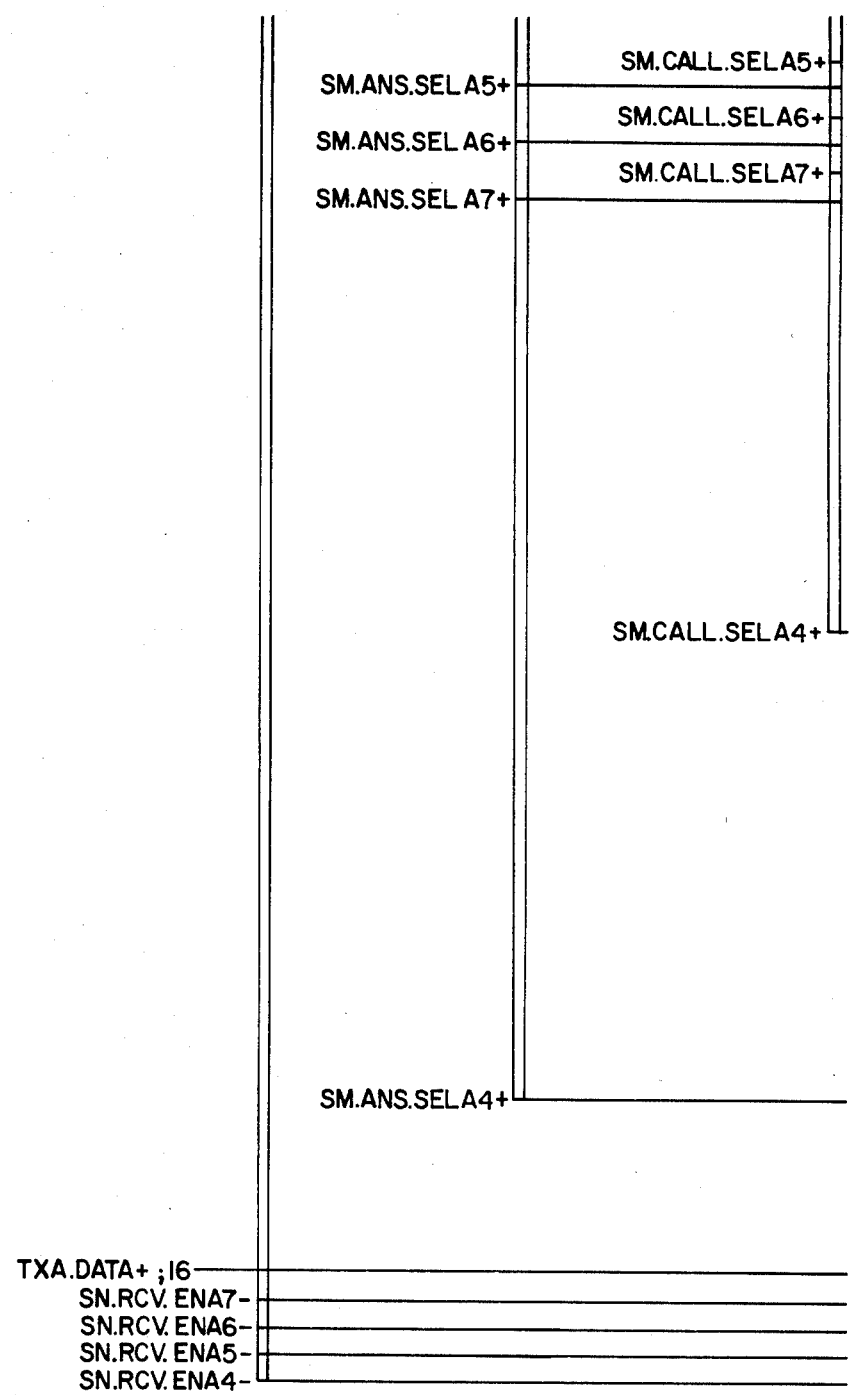
FIG._3E3.

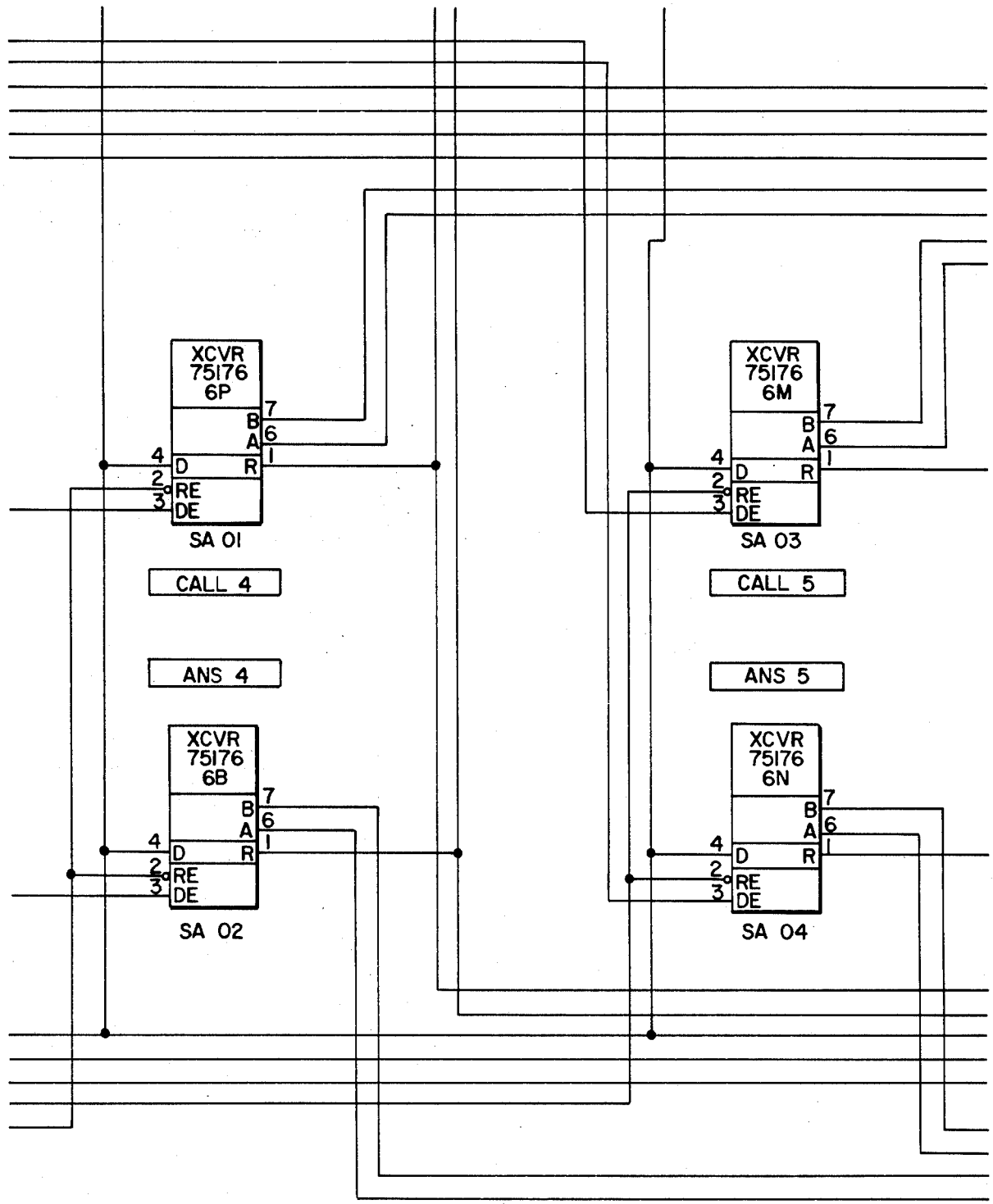
FIG._3E4.

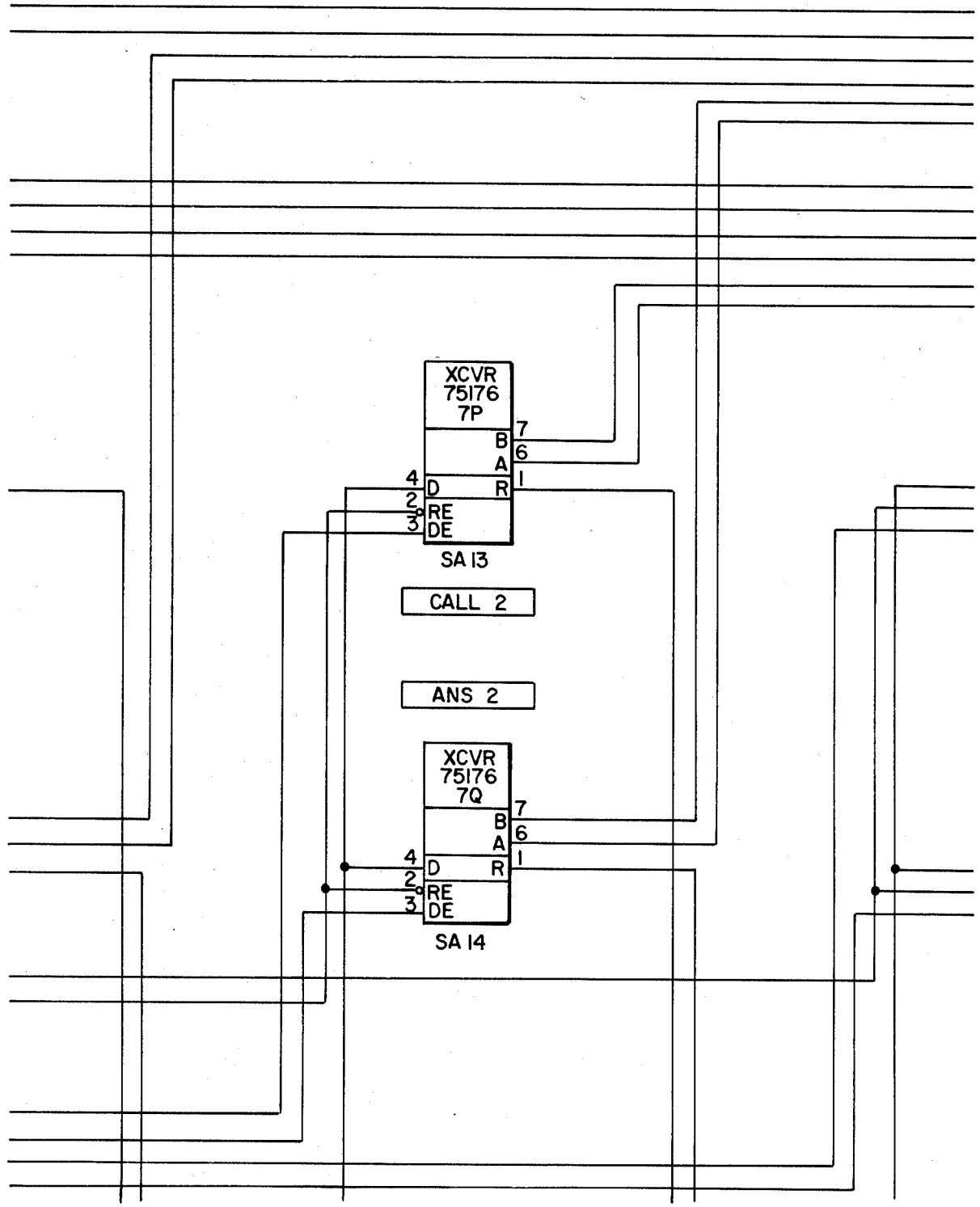
FIG._3F₁

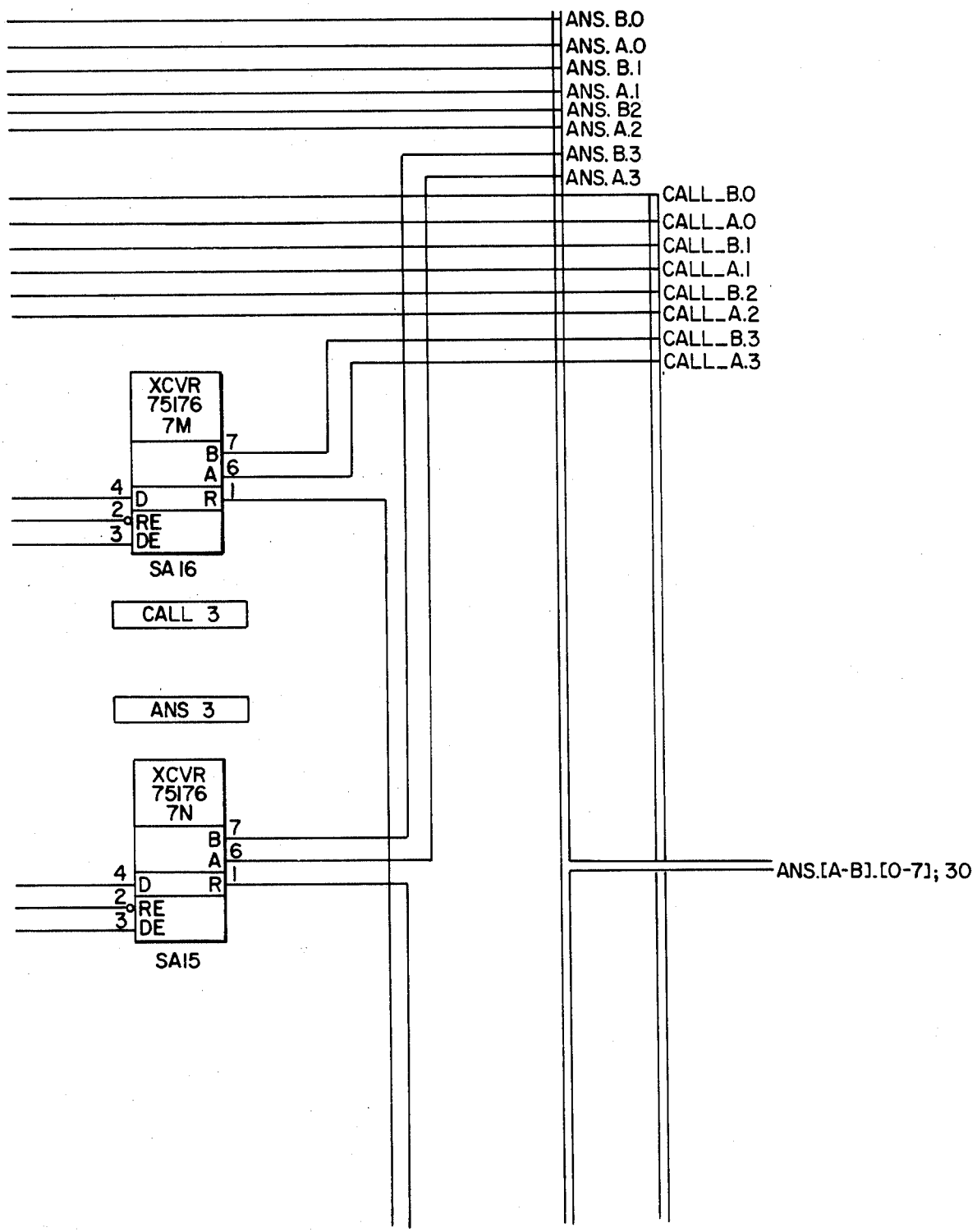
FIG._3F2.

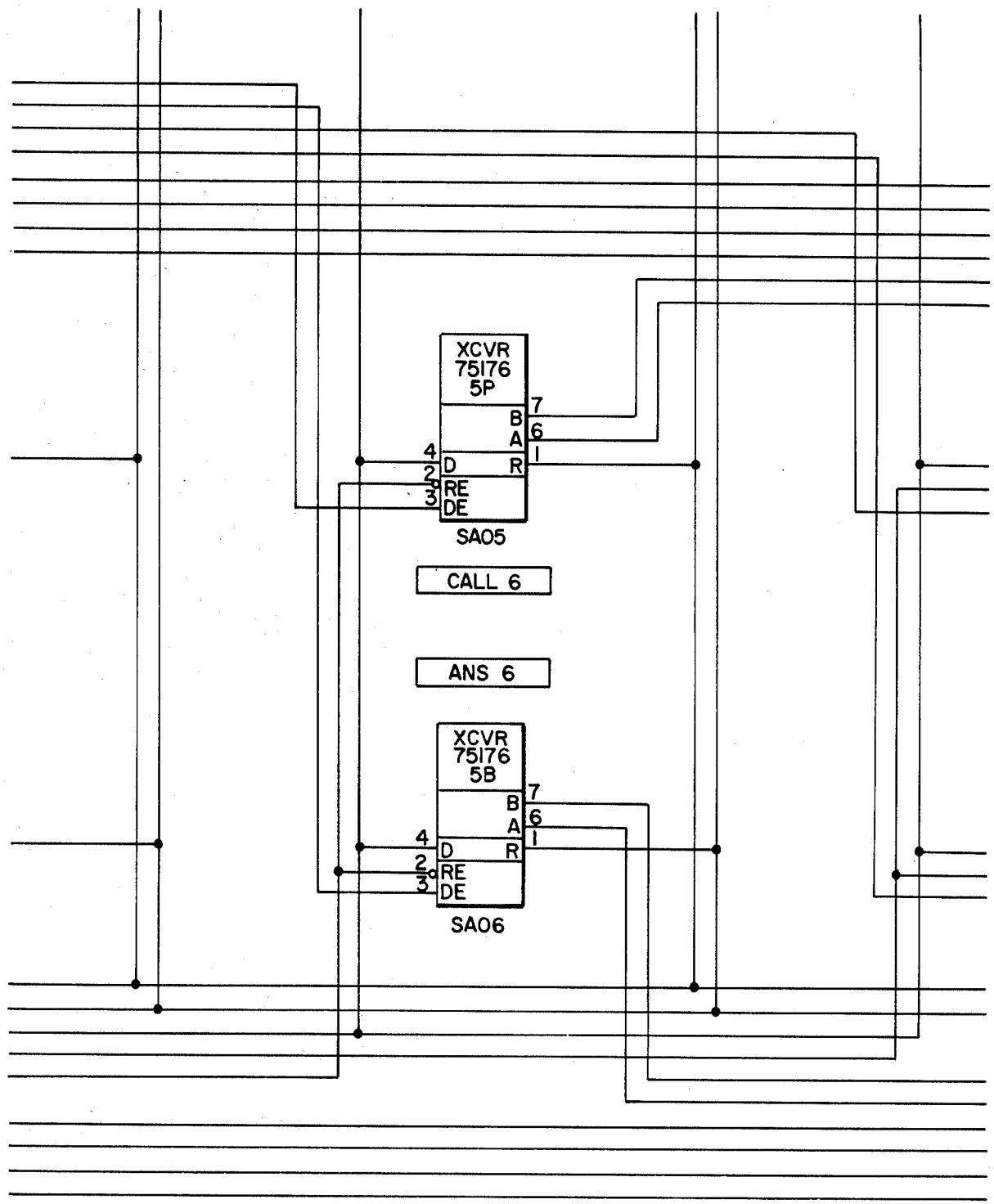
FIG._3F3.

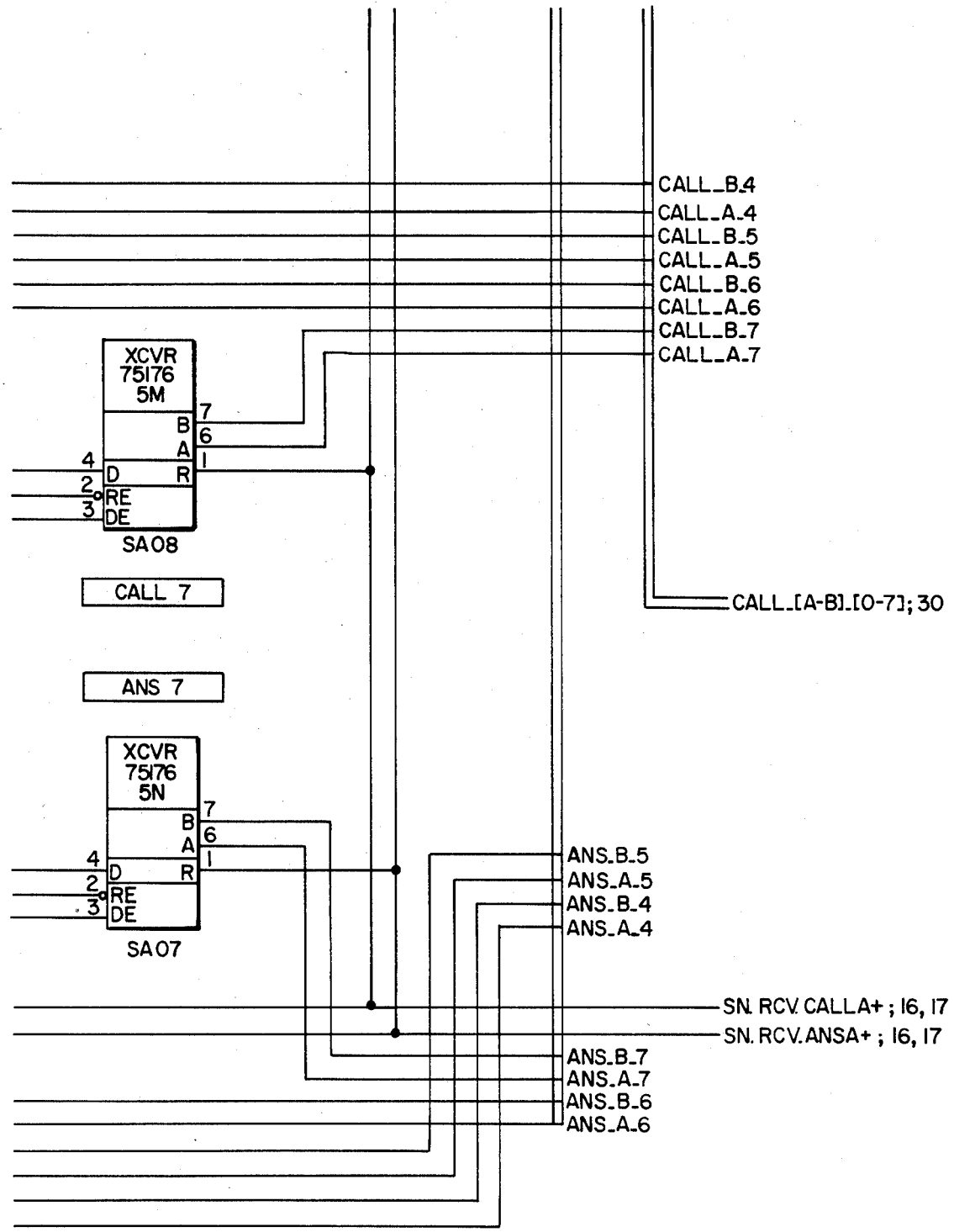
FIG._3F4.

METHOD AND APPARATUS FOR CONTROLLING ACCESS TO AN ASYNCHRONOUS COMMUNICATION NETWORK

BACKGROUND OF THE INVENTION

This invention relates to digital information communication systems and, more particularly, to high throughput systems for communicating digital information. Specifically, the invention is directed to a method and apparatus for providing high throughput digital information communication in an asynchronous communication system in which digital information transceivers are connected in parallel to at least one communication circuit. More specifically, the invention is directed to a method and apparatus for acquiring a communication circuit in such a digital information communication system. The communication circuit acquisition method and apparatus in accordance with the invention are especially advantageous in a high throughput fault tolerant serial digital communication system, such as disclosed in the co-pending patent application of Stephen J. Sheafor and Ken K. S. Weng, entitled "Method and Apparatus For Fault Tolerant Serial Communication of Digital Information," U.S. Ser. No. 540,267, filed on Oct. 7, 1983, the disclosure of which is hereby incorporated by reference.

Generally, the architectures of known information processing systems, such as general purpose programmable digital computer systems, can be classified as either tightly coupled or loosely coupled, the trend being toward the loosely coupled architecture. A centralized memory is shared in a tightly coupled information processing system, and a central communication controller handles communication among the individual information processing elements on a synchronous basis. The burden on the central communication controller can be significant, which can impair the throughput of the information processing system.

A loosely coupled information processing system is also referred to as a distributed information processing system. The centralized memory allocated to each of the information processing elements in the tightly coupled information processing system is replaced by a different architecture. In a loosely coupled information processing system, memory is distributed throughout the information processing elements. That is, each information processing element includes a stand-alone memory and a communication controller. The communication controllers handle communication among the information processing elements through a communication network asynchronously.

The circuit implementation of the architecture in a loosely coupled information processing system can be less complicated than the circuit implementation of a tightly coupled information processing system due to a reduction in the complexity of the communication controller. Even more importantly, the proliferation of information processing elements, such as user terminals, add-on memory elements, and other input/output devices having stand-alone memory, which has occurred for extending the capabilities of the central information processing system, renders the information processing system conducive to a loosely coupled architecture.

Although the principles of the present invention are applicable to tightly coupled information processing systems, the method and apparatus for acquiring a communication circuit in accordance with the invention are particularly advantageous in loosely coupled information processing systems. Therefore, the communication circuit acquisition method and apparatus in accordance with the invention will be described by way of example in connection with loosely coupled information processing systems but should not be considered to be limited to use solely in a loosely coupled architecture.

There are various known techniques for communicating digital information in an information processing system. Several of these techniques are generally directed to communicating digital information in a tightly coupled information processing system.

One known technique for communicating digital information in an information processing system is referred to as polling. The polling technique for communicating digital information implies that the various information processing elements are connected to a central communication controller. The polling technique involves occasional or periodic communication between the central communication controller and each of the information processing elements so that the central communication controller can establish whether or not the information processing element requests communication with the central communication controller or any other information processing element. The polled information processing element is generally conditioned to transmit or receive digital information when the information processing element is polled during the polling procedure. The digital information is typically transmitted from one information processing element to the central communication controller and then to another information processing element in the event that communication is requested between the two information processing elements, rather than directly between the information processing elements. The polling technique assures that there is no simultaneous transmission of digital information by two or more information processing elements, that is, no collision of digital information, on the communication circuit. However, the polling technique does not efficiently utilize the available communication circuits and is not conducive to high throughput communication of digital information.

Another known technique for communicating digital information in an information processing system is time division multiplexing. The time division multiplexing technique for communicating digital information implies a central communication controller which assures synchronization so that each of the various information processing elements has access to the communication circuit during an assigned time slot for transmission of digital information. The remainder of the information processing elements receives the digital information on the communication circuit and responds to the communication if the communicated digital information is directed to that particular information processing element, such as by the detection of an address code. Collision is avoided since each information processing element can transmit digital information only during the assigned time slot. As in the case of the polling technique, however, the time division multiplexing technique does not efficiently utilize the communication circuits and does not enable high throughput digital information communication.

There are other known techniques for communicating digital information in a loosely coupled information processing system. These techniques comprise arbitration, multiple access, carrier sense multiple access (CSMA), carrier sense multiple access with collision detection (CSMA/CD), and token passing. These techniques for communicating digital information are generally used in decentralized information processing systems and are based on recognition of the fact that there might be contention between two or more information processing elements for a communication circuit, which can lead to a collision on the communication circuit that must be acted upon when such a collision occurs.

One known technique for communicating digital information in an information processing system is arbitration. Arbitration is a conceptually straightforward technique for communicating digital information. Various information processing elements are coupled to a central communication controller in parallel. When an information processing element is conditioned to transmit digital information to or receive digital information from another information processing element, the information processing element that is to initiate communication transmits a communication request to the central communication controller. The central communication controller receives such communication requests from each of the information processing elements as the need for communication arises and allocates a communication circuit or circuits in accordance with a predetermined protocol. The central communication controller arbitrates between contemporaneous requests from two or more information processing elements to assign access to the communication circuit or circuits, thereby avoiding simultaneous transmission by two or more information processing elements on a communication circuit. Unfortunately, the arbitration technique, although straightforward in concept, is difficult and expensive to implement and provides relatively low throughput due to the overhead associated with execution of the arbitration technique in order to avoid collision on the communication circuit or circuits.

There is also a finite probability with the arbitration technique that requests for communication can be simultaneously initiated by two or more information processing elements. In the event that simultaneous requests occur, that is, simultaneous contention for the communication circuit or circuits, the central communication controller likely responds to only one of the requests for access to the communication circuit or circuits, and the information processing element which does not gain access to the communication circuit or circuits attempts at a later time to obtain access to the communication circuit or circuits.

The known multiple access technique for communicating digital information does not attempt to determine the availability of the communication circuit for the communication of digital information from one information processing element to another. Rather, an information processing element which is conditioned to communicate with another information processing element merely transmits digital information on the communication circuit. If the information processing element which transmits the digital information does not receive a response from the information processing element to which the communication is directed, the original communication is reinitiated. The multiple access technique does not attempt to avoid collision of transmissions of digital information on the communication circuit, and the occurrence of such a collision results in receipt of an unintelligible communication by the information processing elements connected to the communication circuit.

The known carrier sense multiple access (CSMA) technique attempts to determine the availability of the communication circuit for communication of digital information. If the communication circuit is available, the information processing element which is conditioned to communicate with another information processing element initiates communication. If the communication circuit is busy, the information processing element that is to initiate communication awaits the availability of the communication circuit. The CSMA technique is characterized by the fact that the information processing element which is conditioned to communicate continuously monitors the communication circuit. This places a burden on the information processing element, which renders that information processing element unavailable for performing other information processing functions. Furthermore, there is a finite probability that two or more information processing elements sense that the communication circuit is available and simultaneously transmit digital information on the communication circuit, in which case a mechanism must be present to handle the appearance of unintelligible digital information on the communication circuit. Nevertheless, if communication over the communication circuit by the information processing elements is infrequent, then the probability of occurrence of collisions is low, and CSMA provides an effective technique for communication of digital information.

An extension of CSMA is the known CSMA with collision detection (CSMA/CD) technique. The CSMA/CD technique is described in Institute of Electrical and Electronic Engineers Publication No. 802. The CSMA/CD technique enhances the CSMA technique by the provision of a mechanism for checking digital information transmitted on the communication circuit in order to ascertain simultaneous transmission of digital information by two or more information processing elements on the communication circuit. In circumstances where the frequency of communication over the communication circuit is higher than anticipated in circumstances where CSMA is effective, CSMA/CD is an effective technique for communicating digital information. However, implementation of the CSMA/CD technique is more complex and expensive than implementation of the CSMA technique.

The token passing technique for communicating digital information is also described in Institute of Electrical and Electronic Engineers Publication No. 802. The token passing technique establishes a communication protocol within the information processing system so that the various information processing elements are configured in a ring or daisy chain. The availability of the communication circuit for communication by one information processing element to another is transferred from one information processing element to another. As in the case of the above-described polling technique and time division multiplexing technique, the token passing technique assures that no collision of digital information occurs on the communication circuit since only one information processing element is granted access to the communication circuit at a given time. The token passing technique, however, is inefficient unless the demand for access to the communication circuit is high. If the communication circuit is heavily loaded, then the token passing technique is advantageous because the token passing technique is deterministic of the availability of the communication circuit to the information processing element currently granted access to the communication circuit.

Each of the known techniques for communicating digital information in an information processing system appears to have certain advantages and certain disadvantages. In view of the severe limitation of the multiple access technique with regard to the inability to handle collisions and the limitation of the multiple access technique to information processing systems in which communication of digital information is frequent, the multiple access technique is not widely used. On the other hand, the token passing technique is often used in instances where the communication circuit is heavily loaded because of the deterministic characteristic of the token passing technique which assures that only one information processing element transmits over the communication circuit at a given time. The token passing technique, however, is not advantageous in other than instances where there is a heavily loaded communication circuit and can affect throughput in an information processing system, such as the high throughput fault tolerant serial digital communication system disclosed in the aforementioned Sheafor et al. patent application.

The Sheafor et al. patent application discloses a digital information communication system which provides high throughput fault tolerant serial digital information communication preferably characterized by full duplex, bidirectional communication of digital information in the form of messages being communicated in serial format at a first rate and half duplex, unidirectional communication of digital information in the form of large blocks of data being communicated in serial format at a second higher rate in order to enhance throughput. In view of the communication of large blocks of data at a higher rate, throughput over the communication circuits in the digital information communication system is improved, which reduces the average time needed by an information processing element to communicate digital information. This in turn reduces the load on the communication circuits and can reduce the need for the use of the token passing technique for communicating digital information. Consequently, the high throughput fault tolerant serial digital information communication method and apparatus disclosed in the Sheafor et al. patent application is susceptible to use of the CSMA or CSMA/CD technique. However, there is a severe disadvantage to use of the known CSMA or the known CSMA/CD technique for communicating digital information in that the processor of the information processing element which is conditioned to communicate with another information processing element must continuously monitor the communication circuit so as to ascertain when the communication circuit is available. This severely burdens the processor of the information processing element and precludes the processor from performing other information processing functions. This represents an inefficient overhead function for the processor included in the information processing element and results in a loss of the data processing power of the processor.

SUMMARY OF THE INVENTION

The present invention provides a method and apparatus for acquiring a communication circuit, thereby avoiding the need for the processor associated with the information processing element to monitor the communication circuit in order to ascertain when the communication circuit is available. The communication circuit acquisition method and apparatus in accordance with the invention frees the processor included in the information processing element for performing other data processing functions, thereby utilizing the processor more efficiently. The method and apparatus for acquiring a communication circuit in accordance with the invention also reduce the probability of a collision on the communication circuit.

In accordance with the method aspect of the invention, a method is provided for digital information communication whereby at least one of a plurality of information processing elements is coupled to at least one other of the plurality of information processing elements. The method comprises the steps of: interfacing each of the plurality of information processing elements to a plurality of coupling means connected to at least one communication circuit; interfacing each of a plurality of communication controller means associated with the plurality of coupling means to the communication circuit; initiating communication circuit acquisition means included in the communication controller means in response to a control signal produced by a processor included in the communication controller means when access to the communication circuit is needed for communication of digital information from the one information processing element to another; releasing the processor to perform other data processing functions; detecting the availability of the communication circuit by means of the communication circuit acquisition means; acquiring the communication circuit under control of the communication circuit acquisition means for transmission of digital information over the communication circuit; and initiating transmission of digital information over the communication circuit acquired by the communication circuit acquisition means under control of the processor.

In one embodiment of apparatus in accordance with the invention, apparatus is provided for digital information communication whereby at least one of a plurality of information processing elements is coupled to at least one other of the plurality of information processing elements. The apparatus comprises: means for interfacing each of the plurality of information processing elements to a plurality of coupling means connected to a communication circuit; means for interfacing each of a plurality of communication controller means associated with the plurality of coupling means to the communication circuit; a processor included in the communication controller means for producing a control signal when access to the communication circuit is needed for communication of digital information from the one information processing element to another; and communication circuit acquisition means included in the communication controller means responsive to the control signal for acquiring the communication circuit, thereby releasing the processor to perform other data processing functions; the processor initiating transmission of digital information over the communication circuit acquired by the communication circuit acquisition means.

One embodiment of the invention provides acquire logic circuitry included in a low speed serial interface associated with a system module circuit included in a server means which operates for acquiring a designated or assigned home communication channel or circuit for another server means to which a message is to be transmitted. This avoids the need for having the processor associated with the system module circuit poll the designated or assigned home communication channel or circuit and, therefore, frees the processor for other tasks, such as responding to messages from other server means while in a wait mode (i.e., while the system module circuit must itself wait in order to transmit a message). The acquire logic circuitry included in the low speed serial interface of the associated system module circuit included in the server means which is to initiate communication detects the availability of the designated or assigned home communication channel or circuit of the server means to which the message is to be transmitted and acquires that home circuit if the home circuit becomes available, at which time the message is transmitted. When the acquire logic circuitry included in the low speed serial interface of the associated system module circuit included in the server means which is to initiate communication of a message over a designated or assigned home communication channel or circuit for the server means to which the message is to be transmitted acquires the home circuit, the acquire logic circuitry provides a stream of first flags on that home circuit in order to maintain availability of the home circuit for transmission of the message. The acquire logic circuitry included in the low speed serial interface maintains the availability of the home communication channel or circuit until such time as the message and perhaps data as well is transmitted between the information processing elements.

In one embodiment of the method and apparatus for acquiring a communication circuit in accordance with the invention, communication of digital information is originated by a request from a personality module circuit included in one information processing element for communication with another information processing element. The system module circuit prepares a message for establishing communication with the other information processing element and initiates the acquire logic circuitry included in the low speed serial interface associated with the system module circuit. When the acquire logic circuitry is initiated, the acquire logic circuitry detects the availability of the home communication channel or circuit for the information processing element to which the message is to be communicated. Meanwhile, the processor included in the system module circuit can perform other data processing functions. The acquire logic circuitry immediately acquires the home communication channel or circuit if the home circuit is not busy and reserves the home circuit even though the message has not been completely assembled by the processor associated with the system module circuit for transmission. The acquire logic circuitry acquires the home communication channel or circuit in a minimal time, on the order of 200 nanoseconds, when the home circuit is available, and after the circuit is acquired, transmits flags so that the circuit appears busy to other information processing elements.

The time needed for acquisition of the home communication channel or circuit, that is, the approximately 200-nanosecond period, constitutes a period or window during which contention for the home circuit by two or more information processing elements might occur. However, if the period of the window is minimal, collision is less likely to occur. The acquire logic circuitry which is dedicated to acquiring the home communication channel or circuit reduces the period during which contention might occur in comparison to the time needed for a processor included in the system module circuit to poll and initiate transmission of the message, which reduces the likelihood of a collision.

If assembly of the message is complete, that is, the message is ready for transmission, the processor included in the system module circuit initiates a direct memory access controller to commence transfer of the message through a serial interface circuit and a multiplexer for transmission over the acquired home communication channel or circuit. If the message is ready for transmission, the time during which the acquire logic circuitry reserves the home communication channel or circuit is minimal since the time needed after acquisition of the home circuit before the message is transmitted is a function of overhead of the processor included in the system module circuit for initiating the direct memory access controller. This optimizes the communication function in the information processing system. The total time needed by the acquire logic circuitry for acquiring and reserving the home communication channel or circuit is less than would be needed by the processor included in the system module circuit to poll the home circuit and transmit the message.

The acquire logic circuitry can detect that the home communication channel or circuit is unavailable, that is, busy. In one embodiment in accordance with the invention, if the home communication channel or circuit is busy, the acquire logic circuitry can be reinitiated at a later time to acquire the home circuit detected initially to have been busy.

In another contemplated embodiment in accordance with the invention, if the home communication channel or circuit is busy, the acquire logic circuitry detects that the home circuit is unavailable and attempts to acquire the circuit at a later time. After a period of time transpires, the acquire logic circuitry again attempts to acquire the home communication channel or circuit if the home circuit was initially busy. The acquire logic circuitry interrupts the processor associated with the system module circuit when the home communication channel or circuit becomes available, at which time the message is transmitted.

Preferably, the communication circuits are full duplex. The acquire logic circuitry considers that the home communication circuit is busy if either one of the channels in the full duplex communication circuit is busy.

Particularly in the case where the communication channels or circuits are busy, the acquire logic circuitry frees the processor included in the system module circuit for performing other data processing functions, thereby enhancing the data processing power of the information processing system. A concomitant feature is that the probability of collision is substantially reduced due to the dedication of the acquire logic circuitry to acquiring the communication circuit over which digital information is to be transmitted. The communication circuit acquisition method and apparatus in accordance with the invention provide improved access to the communication circuit and fewer collisions on the communication circuit while permitting the processor of the system module circuit to perform other data processing functions.

BRIEF DESCRIPTION OF THE DRAWINGS

The above and other features and the concomitant advantages of the present invention will be better understood and appreciated by those skilled in the art in view of the description of the preferred embodiments given below in connection with the accompanying drawings. In the drawings:

FIG. 1 is a block diagram of an information processing system including an embodiment of the communication circuit acquire logic circuitry in accordance with the present invention included in a dual speed serial digital information communication network;

FIG. 2 is a block diagram of the dual speed serial digital information communication network shown in FIG. 1;

FIG. 3, comprising FIGS. 3A-3F connected as shown, is a schematic circuit diagram for acquire logic circuitry preferably included in the dual speed serial digital information communication network shown in FIG. 2;

FIG. 4 is a block diagram of multiplexer circuits preferably included in the dual speed serial digital information communication network shown in FIG. 2;

FIG. 5 illustrates the preferred format for digital information written into a control register included in the acquire logic circuitry shown in FIG. 3;

FIG. 6 illustrates the preferred format for digital information stored in a status register included in the acquire logic circuitry shown in FIG. 3;

FIG. 7 is a time sequence diagram for dual speed serial digital information communication; and FIG. 8, comprising FIG. 8A and FIG. 8B, illustrates the preferred format for messages (FIG. 8A) and data (FIG. 8B) communicated by the dual speed serial digital information communication network shown in FIG. 1.

DESCRIPTION OF THE PREFERRED EMBODIMENTS

FIG. 1 shows an information processing system, such as a general purpose programmable digital computer system, which preferably incorporates a dual speed serial digital information communication network generally indicated by the numeral 10. A plurality of information processing elements is preferably loosely coupled by means of the dual speed serial digital information communication network 10. Various information processing elements can be included in the information processing system, for example, a host computer or CPU 12 interfaced to the dual speed serial digital information communication network 10. Various other information processing elements are shown interfaced to the dual speed serial digital information communication network 10, such as local controllers or user terminals 14, remote controllers or user terminals 16, and an add-on memory 18, such as local disk storage.

The dual speed serial digital information communication network 10 includes a plurality of server means $20_1$, $20_2$, ... $20_n$ which interface the information processing elements, such as the CPU 12, local user terminals 14, etc., to communication circuits 22 also included in the communication network, as well as control the communication of digital information in the form of messages and large blocks of data among the various information processing elements. The server means $20_1$, for example, interfaces the add-on memory 18 to the communication circuits 22 for access by other information processing elements, such as the CPU 12. The server means $20_n$, on the other hand, does not interface with an information processing element, but, rather, stores and executes user programs.

The dual speed serial digital information communication network 10 is shown in greater detail in FIG. 2. FIG. 2 illustrates the plurality of server means $20_1$, $20_2$, ... $20_n$. As indicated in FIG. 2, the server means $20_1$ is by way of example connected to the add-on memory 18.

In the event that a server means $20_1$, $20_2$, ... $20_n$ is connected to an information processing element, connection is by means of a transfer means or bus 24, such as in the case of the connection of the add-on memory 18 to the server means $20_1$, as shown in FIG. 2. The server means $20_2$ can be similarly connected to any other loosely coupled information processing element associated with the dual speed serial digital information communication network 10, such as the local user terminals 14, by means of another transfer means or bus 24. Finally, by way of example, the server means $20_n$ is not connected to an information processing element, but, rather, serves as a task processor for storing and executing user programs.

Referring to FIG. 2, each of the server means $20_1$, $20_2$, ... $20_n$ includes a coupling means or personality module circuit $26_1$, $26_2$, ... $26_n$, respectively. The personality module circuit $26_1$, for example, is configured both in circuit implementation and ancillary stored programmed instructions for interfacing with the add on memory 18 over a transfer means or bus 24. The personality module circuit $26_2$ is configured in both circuit implementation and ancillary stored programmed instructions for interfacing with the local user terminals 14 over another transfer means or bus 24. The personality module circuit $26_n$, on the other hand, does not interface with an information processing element, but, rather, is configured both in circuit implementation and ancillary stored programmed instructions as a task processor for executing applications programs.

Each of the personality module circuits $26_1$, $26_2$, ... $26_n$ includes a high speed serial interface $28_1$, $28_2$, ... $28_n$, respectively, which connects the processor and memory included in the associated personality module circuit to a preselected subset of the communication circuits 22 as will be described later. Each of the high speed serial interfaces $28_1$, $28_2$, ... $28_n$ includes a direct memory access interface (DMA) $30_1$, $30_2$, ... $30_n$, respectively, in series with a serial interface circuit $32_1$, $32_2$, ... $32_n$, respectively, in series with a multiplexer circuit $34_1$, $34_2$, ... $34_n$, respectively. Each of the DMAs $30_1$, $30_2$, ... $30_n$ accesses the memory included in the associated personality module circuit $26_1$, $26_2$, ... $26_n$, the digital information being routed by the associated serial interface circuit $32_1$, $32_2$, ... $32_n$ onto one of the subset of communication circuits 22 connected to the serial interface circuit by the associated multiplexer circuit $34_1$, $34_2$, ... $34_n$ during communication. As will be described later, the high speed serial interfaces $28_1$, $28_2$, ... $28_n$ included in the respective personality module circuits $26_1$, $26_2$, ... $26_n$ operate to exchange digital information in the form of large blocks of data among one another. Since large blocks of data are communicated among the personality module circuits $26_1$, $26_2$, ... $26_n$, communication time is a significant consideration as will be mentioned again later.

As shown in FIG. 2, each of the server means $20_1$, $20_2$, ... $20_n$ further includes a system module circuit $36_1$, $36_2$, ... $36_n$, respectively. The system module circuits $36_1$, $36_2$, ... $36_n$ are configured both in circuit implementation and ancillary stored programmed instructions as the communication controller means for the dual speed serial digital information communication network 10.

Each of the system module circuits $36_1$, $36_2$, ... $36_n$ includes at least one, and preferably two, low speed serial interfaces $38_{1a,1b}$, $38_{2a,2b}$, ... $38_{na,nb}$, respectively, which connect the processor and memory included in the associated system module circuit to the communication circuits 22 as will be described later. Each of the low speed serial interfaces $38_{1a,1b}$, $38_{2a,2b}$, ... $38_{na,nb}$ preferably includes DMAs $40_{1a,1b}$, $40_{2a,2b}$, ... $40_{na,nb}$, respectively, in series with serial interface circuits $42_{1a,1b}$, $42_{2a,2b}$, ... $42_{na,nb}$, respectively, in series with multiplexer circuits $44_{1a,1b}$, $44_{2a,2b}$, ... $44_{na,nb}$, respectively. In accordance with one embodiment of the invention, each of the multiplexer circuits $44_{1a,1b}$, $44_{2a,2b}$, ... $44_{na,nb}$ preferably includes acquire logic circuitry $43_{1a,1b}$, $43_{2a,2b}$, ... $43_{na,nb}$, respectively, for acquiring one of the communication circuits 22 for communication of digital information. The DMAs $40_{1a,1b}$, $40_{2a,2b}$, ... $40_{na,nb}$ access the memory included in the respective system module circuit $36_1$, $36_2$, ... $36_n$, the digital information being routed by the associated serial interface circuits $42_{1a,1b}$, $42_{2a,2b}$, ... $42_{na,nb}$ onto the communication circuits 22 connected to the serial interface circuits by the associated multiplexer circuits $44_{1a,1b}$, $44_{2a,2b}$, ... $44_{na,nb}$ during communication. In contrast to the personality module circuits $26_1$, $26_2$, ... $26_n$, the system module circuits $36_1$, $36_2$, ... $36_n$ do not communicate large blocks of data, but, rather, communicate digital information in the form of messages and other information among one another. Consequently, the time of communication is not as significant a factor as in the case of the communication of large blocks of data by means of the personality module circuits $26_1$, $26_2$, ... $26_n$. As a result, the high speed serial interfaces $28_1$, $28_2$, ... $28_n$ included in the respective personality module circuits $26_1$, $26_2$, ... $26_n$ are slightly differently configured than the low speed serial interfaces $38_{1a,1b}$, $38_{2a,2b}$, ... $38_{na,nb}$ included in the respective system module circuits $36_1$, $36_2$, ... $36_n$ as will be described later. The differences between the high speed serial interfaces $28_1$, $28_2$, ... $28_n$, which are included in the respective personality module circuits $26_1$, $26_2$, ... $26_n$, and the low speed serial interfaces $38_{1a,1b}$, $38_{2a,2b}$, ... $38_{na,nb}$, which are included in the respective system module circuits $36_1$, $36_2$, ... $36_n$, enable dual speed serial communication of digital information over the communication circuits 22, namely, communication of messages among the system module circuits at a first rate and communication of large blocks of data among the personality module circuits at a second higher rate.

The personality module circuits $26_1$, $26_2$, ... $26_n$ and the associated system module circuits $36_1$, $36_2$, ... $36_n$ included in the respective server means $20_1$, $20_2$, ... $20_n$ are interconnected by VME buses $45_1$, $45_2$, ... $45_n$, respectively. The configuration of the VME buses $45_1$, $45_2$, ... $45_n$ is disclosed in Motorola Part No. M68KVMEB(D1) entitled "VME Bus Specification Manual (Rev. A)," October, 1981, available from Motorola Inc., Schaumburg, Ill.

Also included in the dual speed serial digital information communication network 10 are the communication circuits 22. The communication circuits 22 preferably include a plurality of four-wire, full duplex communication channels $46_1$, $46_2$, ... $46_m$ for full duplex, bidirectional communication of digital information in the form of messages in serial format, as well as half duplex, unidirectional communication of digital information in the form of large blocks of data in serial format.

The server means $20_1$, $20_2$, ... $20_n$ are connected in the following preferred configuration to the four-wire, full duplex communication channels $46_1$, $46_2$, ... $46_m$ included in the communication circuits 22 for providing high throughput fault tolerant digital information communication. Insofar as the preferred configuration is concerned, the number n of the plurality of server means $20_1$, $20_2$, ... $20_n$ is not necessarily the same as the number m of the plurality of four-wire, full duplex communication channels $46_1$, $46_2$, ... $46_m$ included in the communication circuits 22. In one embodiment in accordance with the invention, for example, the number n of server means $20_1$, $20_2$, ... $20_n$ can be thirty-two, while the number m of four-wire, full duplex communication channels $46_1$, $46_2$, ... $46_m$ included in the communication circuits 22 can be sixteen. Consequently, the connection of the server means $20_1$, $20_2$, ... $20_n$ to the communication circuits 22 will be described by way of example for the case where there are sixteen four-wire, full duplex communication channels $46_1$, $46_2$, ... $46_m$, namely, communication channels $46_1$, $46_2$, ... $46_{16}$, included in the communication circuits. The connection of the server means $20_1$, $20_2$, ... $20_n$ to the four-wire, full duplex communication channels $46_1$, $46_2$, ... $46_m$ included in the communication circuits 22 is directed to provide high throughput over the dual speed serial digital information communication network 10 with fault tolerance. The configuration is preferably implemented with each of the system module circuits $36_1$, $36_2$, ... $36_n$ included in the respective server means $20_1$, $20_2$, ... $20_n$ having two low speed serial interfaces $38_{1a,1b}$, $38_{2a,2b}$, ... $38_{na,nb}$, respectively, as will be described later.

Optimized transfer of digital information among the server means $20_1$, $20_2$, ... $20_n$ is based on the following considerations. Optimization is in part based on the configuration of the server means $20_1$, $20_2$, ... $20_n$ having the respective personality module circuits $26_1$, $26_2$, ... $26_n$ and system module circuits $36_1$, $36_2$, ... $36_n$, the operation required for communication of digital information being divided between the personality module circuit and system module circuit included in each of the server means for enabling communication of messages at a first rate and communication of large blocks of data at a second higher rate under the control of the system module circuits. The optimization is also based in part on the configuration of the personality module circuits $26_1$, $26_2$, ... $26_n$ included in the respective server means $20_1$, $20_2$, ... $20_n$ so that the personality module circuits communicate among one another over the communication circuits 22 and, on the other hand, configuration of the system module circuits $36_1$, $36_2$, ... $36_n$ included in the respective server means so that the system module circuits communicate among one another over the communication circuits. Simply stated, the personality module circuits $26_1$, $26_2$, ... $26_n$ included in the respective server means $20_1$, $20_2$, ... $20_n$ communicate with other personality module circuits, and the system module circuits $36_1$, $36_2$, ... $36_n$ included in the respective server means communicate with other system module circuits for optimizing throughput over the communication circuits 22 by enabling communication of messages at a first rate and large blocks of data at a second higher rate. The optimization is further based on the connection of the server means $20_1$, $20_2$, ... $20_n$ to the four-wire, full duplex communication channels $46_1$, $46_2$, ... $46_m$ included in the communication circuits 22 based on the use of as many of the communication channels as needed during operation for providing access to available communication channels so that communication of digital information among the server means is typically transacted on demand without the delays characteristic of known single channel serial network architectures, as well as parallel bus network architectures having a limited number of additional buses (i.e., a single additional bus as disclosed in Katzman et al., U.S. Pat. No. 4,228,496). Furthermore, the configuration of the dual speed serial digital information communication network 10 is based on a high fault tolerance by providing a plurality of four-wire, full duplex communication channels $46_1, 46_2, \ldots 46_m$ (i.e., more than the two communication circuits disclosed in Katzman et al., U.S. Pat. No. 4,228,496) so that even under fault conditions, such as one or more of the communication channels being short circuited or open circuited, sufficient communication channels remain available in order to assure that the throughput of digital information is not significantly impaired.

Accordingly, referring to FIG. 2, each of the high speed serial interfaces $28_1, 28_2, \ldots 28_n$ included in the respective personality module circuits $26_1, 26_2, \ldots 26_n$ of the associated server means $20_1, 20_2, \ldots 20_n$ is connected to at least two and preferably to a preselected subset of the four-wire, full duplex communication channels $46_1, 46_2, \ldots 46_m$ included in the communication circuits 22. As shown in FIG. 2, the high speed serial interfaces $28_1, 28_2, \ldots 28_n$ included in the respective personality module circuits $26_1, 26_2, \ldots 26_n$ are connected to eight of the four-wire, full duplex communication channels, for example, communication channels $46_9, 46_{10}, \ldots 46_{16}$, in the exemplary embodiment where sixteen four-wire, full duplex communication channels are included in the communication circuits 22. More or less than eight four-wire, full duplex communication channels $46_1, 46_2, \ldots 46_m$ included in the communication circuits 22, however, can be contained in the subset of communication channels connected to the high speed serial interfaces $28_1, 28_2, \ldots 28_n$ included in the respective personality module circuits $26_1, 26_2, \ldots 26_n$ for optimizing communication of large blocks of data among the personality module circuits during operation.

Referring to FIG. 2, each of the system module circuits $36_1, 36_2, \ldots 36_n$ included in the respective server means $20_1, 20_2, \ldots 20_n$ as mentioned earlier preferably includes two low speed serial interfaces $38_{1a,1b}, 38_{2a,2b}, \ldots 38_{na,nb}$, respectively, connected to the four-wire, full duplex communication channels $46_1, 46_2, \ldots 46_m$ included in the communication circuits 22 in the following configuration. One of the two low speed serial interfaces $38_{1a,1b}, 38_{2a,2b}, \ldots 38_{na,nb}$ included in the respective system module circuits $36_1, 36_2, \ldots 36_n$, such as the low speed serial interfaces $38_{1a}, 38_{2a}, \ldots 38_{na}$, is connected to each of the four-wire, full duplex communication channels $46_1, 46_2, \ldots 46_m$ included in the communication circuits 22, namely, communication channels $46_1, 46_2, \ldots 46_{16}$ in the exemplary embodiment where sixteen four-wire, full duplex communication channels are included in the communication circuits. One of the four-wire, full duplex communication channels $46_1, 46_2, \ldots 46_{16}$ in the exemplary embodiment is designated or assigned as a home communication channel or circuit over which communication preferably occurs as will be described in more detail later. The other of the two low speed serial interfaces $38_{1b}, 38_{2b}, \ldots 38_{nb}$ included in the respective system module circuits $36_1, 36_2, \ldots 36_n$ is connected to the four-wire, full duplex communication channels $46_1, 46_2, \ldots 46_m$ included in the communication circuits 22 which are not contained in the subset of communication channels to which the high speed serial interfaces $28_1, 28_2, \ldots 28_n$ included in the respective personality module circuits $26_1, 26_2, \ldots 26_n$ are connected, namely, communication channels $46_1, 46_2, \ldots 46_8$, in the exemplary embodiment where sixteen four-wire, full duplex communication channels are included in the communication circuits. The connections of the system module circuits $36_1, 36_2, \ldots 36_n$ included in the respective server means $20_1, 20_2, \ldots 20_n$ are for optimizing the availability of the communication channels for communication of digital information in order to increase throughput and for providing fault tolerance, as well as for enabling communication of messages among the system module circuits at a first rate lower than the rate at which large blocks of data are communicated among the personality module circuits $26_1, 26_2, \ldots 26_n$ included in the respective server means. Preferably, as will be described in more detail later, one of the four-wire, full duplex communication channels $46_1, 46_2, \ldots 46_8$ in the exemplary embodiment is designated as a master communication channel or circuit for use as an alternative communication circuit, as well as the communication circuit over which one of the system module circuits $36_1, 36_2, \ldots 36_n$ in the form of a health monitor means periodically tests the operability of the elements of the dual speed serial digital information communication network 10.

The architecture of the dual speed serial digital information communication network 10 as indicated above is configured for high throughput communication of digital information over the communication circuits 22 through allocation of the personality module circuit $26_1, 26_2, \ldots 26_n$ included in the respective server means $20_1, 20_2, \ldots 20_n$ to the exchange of digital information in the form of large blocks of data with other personality module circuits and through allocation of the system module circuits $36_1, 36_2, \ldots 36_n$ included in the respective server means to the exchange of digital information in the form of messages with other system module circuits, communication of messages preferably being at a first rate and communication of large blocks of data being at a second higher rate. The allocation of tasks between the personality module circuits $26_1, 26_2, \ldots 26_n$ and system module circuits $36_1, 36_2, \ldots 36_n$ included in the respective server means $20_1, 20_2, \ldots 20_n$ and the connection of the server means to the four-wire wire, full duplex communication channels $46_1, 46_2, \ldots 46_m$ included in the communication circuits 22 cumulatively provide high throughput fault tolerant serial digital information communication.

Considered in more detail, each of the personality module circuits $26_1, 26_2, \ldots 26_n$ included in the respective server means $20_1, 20_2, \ldots 20_n$ operates either as an interface for an information processing element to the dual speed serial digital information communication network 10 or as a task processor without any associated information processing element. In the case where one or more of the personality module circuits $26_1, 26_2, \ldots 26_n$ is associated with an information processing element, the information processing element is connected to the personality module circuit by a transfer means or bus 24, and the personality module circuit provides the connection through which the information processing element has access to the dual speed serial digital information communication network 10 which provides a communication and operating system including programmed instructions in the form of an executive program for controlling allocations within the overall information processing system shown in FIG. 1. At least one of the personality module circuits $26_1, 26_2,$ ... $26_n$, and preferably a plurality, such as four, personality module circuits, do not interface with information processing elements, but are instead task processors which store programmed instructions in the form of user programs executed in response to user requests entered by means of information processing elements connected to other personality module circuits. The task processors generally execute programs which relate to the exchange, routing, and display (or other output) of system information. The task processors, for example, include editors for manipulating text files or program files; control the displays on the local user terminals 14 and the remote user terminals 16 shown in FIG. 1; and control movement of information between information processing elements included in the information processing system, such as from the CPU 12 to the add-on memory 18 shown in FIG. 1.

Whether or not information processing elements are connected to the personality module circuits $26_1$, $26_2$, ... $26_n$, however, each of the personality module circuits is identically connected to the four-wire, full duplex communication channels $46_1$, $46_2$, ... $46_m$ included in the communication circuits 22. Specifically, the personality module circuits $26_1$, $26_2$, ... $26_n$ are connected to a subset of the four-wire, full duplex communication channels $46_1$, $46_2$, ... $46_m$ included in the communication circuits 22 (i.e., communication channels $46_9$, $46_{10}$, ... $46_{16}$ in the exemplary embodiment where sixteen four-wire, full duplex communication channels are included in the communication circuits) for communication of digital information in the form of large blocks of data as will be described shortly.

By way of contrast, the system module circuits $36_1$, $36_2$, ... $36_n$ are communication controllers which store programmed instructions in the form of an executive program executed for controlling the operation of the system module circuits and communication among the server means $20_1$, $20_2$, ... $20_n$ included in the dual speed serial digital information communication network 10. The system module circuits $36_1$, $36_2$, ... $36_n$ service requests from users entered by means of the information processing elements connected to the personality module circuits $26_1$, $26_2$, ... $26_n$. The system module circuits $36_1$, $36_2$, ... $36_n$ process the user requests and communicate with the other system module circuits and the CPU 12 shown in FIG. 1. The low speed serial interfaces $38_{1a}$, $38_{2a}$, ... $38_{na}$ connect the respective system module circuits $36_1$, $36_2$, ... $36_n$ to each of the four-wire, full duplex communication channels $46_1$, $46_2$, ... $46_m$ included in the communication circuits 22 (i.e., all sixteen four-wire, full duplex communication channels in the exemplary embodiment where sixteen four-wire, full duplex communication channels are included in the communication circuits). Also, the low speed serial interfaces $38_{1b}$, $38_{2b}$, ... $38_{nb}$ connect the respective system module circuits $36_1$, $36_2$, ... $36_n$ to the four-wire, full duplex communication channels $46_1$, $46_2$, ... $46_m$ included in the communication circuits 22 (i.e., the communication channels $46_1$, $46_2$, ... $46_8$ in the exemplary embodiment where sixteen four-wire, full duplex communication channels are included in the communication circuits) not contained in the subset of communication channels to which the high speed serial interfaces $28_1$, $28_2$, ... $28_n$ included in the respective personality module circuits $26_1$, $26_2$, ... $26_n$ are connected.

The system module circuits $36_1$, $36_2$, ... $36_n$ operate through the low speed serial interfaces $38_{1a,1b}$, $38_{2a,2b}$, ... $38_{na,nb}$ for monitoring the four-wire, full duplex communication channels $46_1$, $46_2$, ... $46_m$ to which the low speed serial interfaces are connected for messages transmitted to the server means $20_1$, $20_2$, ... $20_n$ with which the system module circuits are associated. In the preferred configuration, the four-wire, full duplex communication channels $46_1$, $46_2$, ... $46_m$ included in the communication circuits 22 preferably used for the communication of messages are the communication channels not contained in the subset of communication channels connected to the high speed serial interfaces $28_1$, $28_2$, ... $28_n$ included in the respective personality module circuits $26_1$, $26_2$, ... $26_n$. Specifically, one of the four-wire, full duplex communication channels $46_1$, $46_2$, ... $46_m$ to which the low speed serial interfaces $38_{1a}$, $38_{2a}$, ... $38_{na}$ are connected not among the communication channels to which the personality module circuits $26_1$, $26_2$, ... $26_n$ are connected is preferably the home communication channel or circuit for the server means $20_1$, $20_2$, ... $20_n$ with which the system module circuit is associated. More than one server means $20_1$, $20_2$, ... $20_n$ can have the same home communication channel or circuit since addresses are used as will be described later.

The system module circuits $36_1$, $36_2$, ... $36_n$ included in the respective server means $20_1$, $20_2$, ... $20_n$ operate through the associated low speed serial interfaces $38_{1a}$, $38_{2a}$, ... $38_{na}$ for initiating communication of a message to another server means on the home communication channel or circuit for the server means to which the message is to be transmitted. The system module circuit $36_1$, $36_2$, ... $36_n$ included in the respective server means $20_1$, $20_2$, ... $20_n$ which receives the message operates through the associated low speed serial interface $38_{1a}$, $38_{2a}$, ... $38_{na}$ for responding to the server means which initiated communication by transmitting a response message in the form of an acknowledgment message over the home communication channel or circuit on which the original message was received.

Meanwhile, the low speed serial interface $38_{1b}$, $38_{2b}$, ... $38_{nb}$ included in the respective system module circuit $36_1$, $36_2$, ... $36_n$ of the associated server means $20_1$, $20_2$, ... $20_n$ which initiated communication of the original message can monitor the master communication channel or circuit for a message from another server means. Consequently, the server means $20_1$, $20_2$, ... $20_n$ can simultaneously transmit and receive messages over the communication circuits 22. The system module circuit $36_1$, $36_2$, ... $36_n$ included in the respective server means $20_1$, $20_2$, ... $20_n$ which receives the original message operates through the associated low speed serial interface $38_{1a}$, $38_{2a}$, ... $38_{na}$ for transmitting an acknowledgement message to the server means which initiated communication over the same four-wire, full duplex communication channel $46_1$, $46_2$, ... $46_m$ on which the original message was received.

The digital information communication among the personality module circuits $26_1$, $26_2$, ... $26_n$ is different from the digital information communication among the system module circuits $36_1$, $36_2$, ... $36_n$ over the four-wire, full duplex communication channels $46_1$, $46_2$, ... $46_m$ included in the communication circuits 22. Communication of digital information in the form of messages among the system module circuits $36_1$, $36_2$, ... $36_n$ is over one of plural (i.e., m) channels, serial per channel, four-wire, full duplex per channel for providing bidirectional digital information exchange. As indicated above, the period for communication of digital information in the form of large blocks of data among the personality module circuits $26_1, 26_2, \ldots 26_n$ is significant in comparison with the period for communication of messages among the system module circuits $36_1, 36_2, \ldots 36_n$. Consequently, communication of messages is preferably at a first rate, for example, two megabits per second, and communication of large blocks of data is at a second higher rate, for example, eight megabits per second. Communication of digital information in the form of large blocks of data among the personality module circuits $26_1, 26_2, \ldots 26_n$ is over one of plural (i.e., m) channels, serial per channel, half duplex per channel for providing unidirectional digital information exchange. As a result, throughput is optimized.

The personality module circuits $26_1, 26_2, \ldots 26_n$ include some amount of memory for storage of digital information in the form of data. The personality module circuits $26_1, 26_2, \ldots 26_n$ also include sufficient processing capability for interfacing an information processing element to the memory, except in the case where the server means $20_1, 20_2, \ldots 20_n$ serves as a task processor in which case the personality module circuit includes sufficient processing capability for executing applications programs resident in the memory. A preferred circuit implementation of the personality module circuits $26_1, 26_2, \ldots 26_n$ is described in the aforementioned Sheafor et al. patent application.

A preferred circuit implementation of the system module circuits $36_1, 36_2, \ldots 36_n$ comprises four general circuit elements Each circuit element is constructed around the following set of integrated circuits.

The processor associated with each of the system module circuits $36_1, 36_2, \ldots 36_n$ is preferably based on a Motorola type MC68000L10 microprocessor, which is described in "Motorola Microprocessors Data Manual, 1981," page 4–661. Industry standard 64K dynamic RAMs are used to create 256K bytes of writable storage, while industry standard erasable programmable read only memory circuits (EPROMs) provide nonvolatile program storage.

The direct memory access (DMA) controller for each of the DMAs $40_{1a,1b}, 40_{2a,2b}, \ldots 40_{na,nb}$ included in the respective low speed serial interfaces $38_{1a,1b}, 38_{2a,2b}, \ldots 38_{na,nb}$ of the associated system module circuits $36_1, 36_2, \ldots 36_n$ is preferably based on a Motorola type MC68B44 four channel DMA control circuit described in the "Motorola Microprocessors Data Manual, 1981," page 4–441. The technique for interfacing this part to the 68000 microprocessor is described in that document.

Each of the serial interface circuits $42_{1a,1b}, 42_{2a,2b}, \ldots 42_{na,nb}$ included in the respective low speed serial interfaces $38_{1a,1b}, 38_{2a,2b}, \ldots 38_{na,nb}$ of the associated system module circuits $36_1, 36_2, \ldots 36_n$ is preferably based around a type 2652 multi-protocol communications controller (MPCC) available from Signetics Corporation of Sunnyvale, Calif., which is specifically designed to handle the known high-level data link control (HDLC) serial protocol. This part is described in "MOS Microprocessor Data Manual 1982," Signetics Part 15M0182.

Each of the multiplexer circuits $44_{1a,1b}, 44_{2a,2b}, \ldots 44_{na,nb}$ includes the acquire logic circuitry $43_{1a,1b}, 43_{2a,2b}, \ldots 43_{na,nb}$, respectively. FIG. 3, comprising FIGS. 3A–3F connected as shown, is a schematic circuit drawing for the acquire logic circuitry $43_{1a,1b}, 43_{2a,2b}, \ldots 43_{na,nb}$, included in the multiplexer circuits $44_{1a,1b}, 44_{2a,2b}, \ldots 44_{na,nb}$, respectively. The acquire logic circuitry $43_{1a,1b}, 43_{2a,2b}, \ldots 43_{na,nb}$ will be described shortly.

Considered in more detail, FIG. 4 is a block diagram of serial line drivers/receivers (SLDR) circuitry of each of the multiplexer circuits $44_{1a,1b}, 44_{2a,2b}, \ldots 44_{na,nb}$ included in the respective low speed serial interfaces $38_{1a,1b}, 38_{2a,2b}, \ldots 38_{na,nb}$ of the associated system module circuits $36_1, 36_2, \ldots 36_n$. This is the interface between the serial interface circuits $42_{1a,1b}, 42_{2a,2b}, \ldots 42_{na,nb}$ and the communication circuits 22. It includes the hardware to connect a serial interface circuit $42_{1a,1b}, 42_{2a,2b}, \ldots 42_{na,nb}$ to a communication circuit 22. The multiplexer/line driver/receiver (MUX) section for each of the multiplexer circuits $44_{1a,1b}, 44_{2a,2b}, \ldots 44_{na,nb}$ included in the respective low speed serial interfaces $38_{1a,1b}, 38_{2a,2b}, \ldots 38_{na,nb}$ of the associated system module circuits $36_1, 36_2, \ldots 36_n$ is preferably constructed from forty-eight Texas Instruments type 75176 serial transceiver circuits. The tristate enabling function of these parts is used for implementing the multiplexing function. These parts are described in "The Line Driver and Receiver Data Book 1981" from Texas Instruments, part number LCC4290A, page 225.

The SLDR circuitry also includes hardware to encode data transferred from the serial interface circuit $42_{1a,1b}, 42_{2a,2b}, \ldots 42_{na,nb}$ in an NRZI format and decode NRZI data transferred to the serial interface circuit. There is also a hardware mechanism to test if a communication circuit 22 is available or free and connect to it, if it is. This is the acquire mechanism embodied in the acquire logic circuitry $43_{1a,1b}, 43_{2a,2b}, \ldots 43_{na,nb}$.

As in the case of the serial interface circuits $42_{1a,1b}, 42_{2a,2b}, \ldots 42_{na,nb}$, there is SLDR circuitry included in each of the low speed serial interfaces $38_{1a,1b}, 38_{2a,2b}, \ldots 38_{na,nb}$. They are also referred to as serial communication channel A and serial communication channel B (PORT A and PORT B).

A programmatic interface is included. There are three locations that are used by the programmed instructions to control the SLDR. The first is a control register that can be written under control of the programmed instructions, the second is a status latch that can be read under control of the programmed instructions, and the last is the acquire trigger location.

There are two registers in the SLDR circuitry, the SLDR control register and the SLDR status register. The control register is write only, and the status register is read only. Some of the information in the control register is mirrored in the status register. These two registers share a common address. The organization of the control register is shown in FIG. 5.

The PORT A control register is comprised of two 74LS373 integrated circuits SA88 and SA89 shown in FIG. 3A that receive inputs from SYSTEM.DATA.-BUS[15:0]+. These registers are clocked by the same signal, SLDR.CTL.LDA+. There is a minor difference on PORT B in that only one 74LS373 integrated circuit is used, and its inputs are wired slightly differently to correspond to the control word.

The PORT A status register is comprised of a 74LS373 integrated circuit SA91 shown in FIG. 3B whose gate and output are controlled by SLDR.RDSTA.EN−. When this signal is asserted, data is driven onto the system data bus and is prevented from changing within the register.

The CIRCUIT NUMBER field designates the communication circuit 22 to which the hardware connects.

The TEST BITS are only implemented in the SLDR circuitry for PORT A, but they affect both PORT A and PORT B. If bit 15 and bit 14 are set to a first logic state, that is, to "1", the internal loop-back, within the 2652 of PORT A, is enabled. If bit 15 is set to "1" and bit 14 is cleared to a second logic state, that is, to "0", the loop-back is implemented outside the 2652. The typical mode of operation is with both bits cleared to "0".

All RESERVED bits are loaded as "0" (cleared).

There are two channels to a communication circuit 22, one is the call channel and the other is the answer channel. If the DIR (direction) bit is "1", the hardware connects the transmitter to the answer channel and the receiver to the call channel. If the DIR bit is "0", the opposite connections are made.

If the LIS (listen) bit is "0", the receiver connections are made in accordance with the sense of the DIR bit, but the transmitter connections are not made. If the LIS bit is "1", both connections are made.

If the TXT (transmitter test) bit is "1", the associated acquire logic circuitry $43_{1a,1b}$, $43_{2a,2b}$, ... $43_{na,nb}$ only tests whether or not the channel to which the transmitter is to be connected is available or free. Otherwise, both channels are tested.

If the ATT (attach only) bit is set to "1", an attempt is made to acquire a communication circuit 22 (channel if TXT is set), but the 2652 is prevented from being activated. This function allows the SLDR circuit to reserve a communication circuit 22 (channel). If this bit is "0", the 2652 is activated as soon as the acquisition is made (as long as the TX ACT bit is set in the special control register included in the associated serial interface circuit $42_{1a,1b}$, $42_{2a,2b}$, ... $42_{na,nb}$).

The INTF (interrupt when free) bit is set to "1" after an attempt has been made to acquire a communication circuit 22 if the attempt fails. When a communication circuit 22 becomes free (marks for 15 bit times), an interrupt is generated. (A bit time is one microsecond when the SLDR circuitry and 2652 are running at one megabit and is 500 nanoseconds when the SLDR circuitry and 2652 are running at two megabits.) The interrupt that is generated is cleared by setting this bit to "0".

The SPD (speed) bit is used to set the speed at which the SLDR circuitry and 2652 run. When set to "1", the SLDR circuitry and 2652 run at the low, onemegabit per second, rate. Otherwise, the speed is two megabits per second.

Writing into the control register has a side effect in hardware in that the transmitter of the 2652 is turned off. Consequently, if a transmitter is driving a channel, the transmitter is stopped from doing so. This is to prevent accidentally turning on a transmitter when a channel is already in use. This control register is preferably written only when a change in the control is needed, for example, the communication circuit is changed or the programmed instructions command that a transmitter be turned off. Reading the control register has no side effects.

Status can be read at the same location. The format of the status word is shown in FIG. 6.

Except for the case of ATT, FRE, and LST, the status bits are the same as the contents of the control register where the designations are the same.

If ATT is "0", the attempt to acquire the communication circuit 22 (channel) has been successful.

If FRE is "1", the communication circuit 22 (channel) is/has been free for fifteen bit times.

If TXN is "1", a normal transmitter interrupt is present.

If RXN is "1", a normal receiver interrupt is present.

If TXA is "1", an abnormal transmitter interrupt is present.

If RXA is "1", an abnormal receiver interrupt is present.

FINT comprises an interrupt generated based on the INTF bit. If FINT is "1", INTF was set to "1" and the communication circuit 22 has become free. (It is not guaranteed to remain free. Also, the interrupt is not automatically reset if the communication circuit 22 becomes unavailable, that is, busy.)

If LST is "1", the message has ended on an even byte location (word boundary).

If RX SPEC END is set to "1" in the associated serial interface circuit $42_{1a,1b}$, $42_{2a,2b}$, ... $42_{na,nb}$ and the residual word count is zero, this indicates an overrun of a single byte, but the overrun byte is not written into memory. Otherwise, it is used as a means of determining the byte count of the received message.

The control and status registers can be accessed at the following locations:
SLDR A Control/Status Word: $038012
SLDR B Control/Status Word: $038002

The SLDR acquire trigger location is read only and is located as follows:
SLDR 'A' Control/Status Word: $038010
SLDR 'B' Control/Status Word: $038000

This is the same address as the special control register included in the associated serial interface circuit $42_{1a,1b}$, $42_{2a,2b}$, ... $42_{na,nb}$, but this is coincidental. Reading at that location performs a control function. It acts as a programmed trigger for the associated acquire logic circuitry $43_{1a,1b}$, $43_{2a,2b}$, ... $43_{na,nb}$. It is an additional procedure for preventing collisions on the backplane of the dual speed serial digital information communication network 10.

The differential transceiver circuitry for PORT A is comprised of 32 SN75176P differential transceiver integrated circuits, including SA01–SA16 shown in FIGS. 3E and 3F, that meet the EIA PN1488 standard. Both receiver enables of a data link circuit are tied together so the free detect logic can monitor both channels of a communication circuit 22. The receiver outputs for the call channel are all tied to SM.RCV.CALLA+. The outputs of the answer channel are connected to SM.RCV.ANSA+. There are only sixteen transceivers for PORT B because it connects to only eight of the sixteen circuits that PORT A does.

The acquire logic circuitry $43_{1a,1b}$, $43_{2a,2b}$, ... $43_{na,nb}$ shown in FIG. 3 is used to determine if a communication circuit 22 is free before the associated system module circuit $36_1$, $36_2$, ... $36_n$ circuit enables one of the transceivers to drive the communication circuit. There are two major control signals that are assertable by the programmed instructions that affect the acquire logic circuitry $43_{1a,1b}$, $43_{2a,2b}$, ... $43_{na,nb}$. The first, SLDR.CTL.LDA-, is the signal that controls the loading of the SLDR control register comprised of two 74LS373 integrated circuits SA89 and SA88 shown in FIG. 3A. When this signal is asserted, the value on the data bus is written into this register. In addition, this signal acts as a reset signal for many of the functions within the acquire logic circuitry $43_{1a,1b}$, $43_{2a,2b}$, ... $43_{na,nb}$. If this reset was not performed, writing into this register might cause the hardware to garble transmission on some other communication circuit 2.

A counter is used to determine if the communication circuit 22 indicated by SLDR.SEL.CIRA[0:3] has been free for more than fifteen bit times. The counter, a 74S161 integrated circuit, has a clear input connected to the AND of SM.RCV.ANSA+, SM.RCV.CALLA+, and SLDR.CTL.LDA− produced by a 74F11 integrated circuit SAS7 shown in FIG. 3A. The carry output of the counter is connected through an inverter SA92, a 74LS04 integrated circuit, to the "P" enable input (pin 7). If the count reaches fifteen (decimal) without either data line having transposed to "0" or SLDR.CTL.LDA− being asserted, counting stops giving an indication that the communication circuit 22 is free by asserting SLDR.CIR.FREEA+. (This counter is clocked by SLDR.TXA.CLK+.) This mechanism tests that both channels of a communication circuit 22 are free.

A 74S151 integrated circuit SA84 shown in FIG. 3A comprises a transmit channel free indicator. The intent of this circuit is to determine if the data of a selected channel transposes to "0". The 74S151 integrated circuit is used as an R-S latch. SLDR.CTL.LDA+ initiates reset. When this is asserted, the "W" (inverting) output of the 74S151 integrated circuit is forced high; and TXA.TXCHAN.FREE+ is asserted. This selects the upper four inputs. If TXA.TXCHAN.FREE+ is deasserted, then D0, D1, D2, or D3 is selected. Because they are tied to a pullup, TXA.TXCHAN.FREE+ remains deasserted.

If SM.TX.FREE.OKA+ is asserted, the programmed instructions command a check that only the channel that has been selected to be transmitted over is free. If it is asserted, D6 or D7 is selected. If SMTX.FREE.OKA+ is deasserted, this acts as a reset to the flip-flop by selecting D4 or D5 which deasserts TXA.TXCHAN.FREE+.

If SM.TX.FREE.OKA+ is asserted, SM.SEL.CALLA− selects between D6 and D7. If it is asserted, D6 is selected so as long as SM.RCV.CALLA+ remains "1" (is inactive) and TXA.TXCHAN.FREE+ remains asserted. But if it is ever deasserted, TXA.TXCHAN.FREE+ is deasserted, and the flip-flop is reset. The function is the same if SM.SEL.CALLA− is deasserted and SM.RCV.ANSA+ is tested.

The actual attempt to acquire the communication circuit 22 is initiated the first time SLDR.SPCTLA.CLK− is asserted (by reading location $038010, $038000 for PORT B) after SLDR.CTL.LDA− has been asserted. This signal indicates that there has been a pause for fifteen bit times to allow the hardware to attempt to acquire the communication circuit 22. This signal clocks the 74F109 integrated circuit SA94 that had previously been cleared by SLDR.CTL.LDA−. The output signal, TXA.ATT.TEST+, is then used as an output to the PAL16R4 integrated circuit SA95. The "J" input is connected to SM.LIS.ONLYA−. If this is asserted, TXA.ATT.TEST+ remains deasserted. This means that the transmitter cannot be enabled onto the communication circuit. After asserting SLDR.SPCTLA.CLK− the first time, there is a pause for a minimum of two bit times and it is asserted again. If TXA.ATT.TEST+ is asserted, this causes it to be deasserted. This is how the programmed instructions control the acquire window which will be described in greater detail later.

The main function of the PAL integrated circuit SA95 is to control TXA.ATT+ and TXA.TXE+. The TXA.ATT+ output from the PAL SA95 is inverted to TXA.ATT−. The equations of the PAL integrated circuit SA95 are shown in TABLE 1. TXA.ATT+ is the signal that enables the selected transceiver to drive a channel. TXA.TXE+ is the enable signal for the 2652 (pin 37, TXE).

TXA.ATT+ is an asynchronous signal and is the output of an R-S flip-flop implemented within the PAL integrated circuit SA95. Both SM.RESET− and SLDR.CTL.LD act as reset signals for the PAL integrated circuit SA95. To minimize the collision window, this signal is asserted very near the rising edge of SLDR.TXA.CLK+ (the edge on which output data changes). Typically, TXA.ATT+ is asserted when TXA.ATT.TEST+ is asserted and either SLDR.CIR.FREEA+ or TXA.TXCHAN.FREE+ is asserted (terms 1 and 2 in the ATT.CT0+ equation shown in TABLE 1). Both of these terms are "AND"ed with ATT.CT0+. ATT.CT0+ is clocked by SLDR.TXA.CLK+. If TXA.ATT+ is currently deasserted, it is asserted on the rising edge of SLDR.TXA.CLK+, when TXA.ATT.TEST+ is asserted and either SLDR.CIR.FREEA+ or TXA.TXCHAN.FREE+ is asserted. Consequently, TXA.ATT+ is asserted within 60 nanoseconds (clock to output and asynchronous delay of the PAL integrated circuit SA95) of the rising edge of SLDR.TXA.CLK+.

TABLE 1

Equations for PAL Chip SA95 (Acquire Logic)

,TYPE—PAL16R4;
,PIN 2: SMRESET−;
,PIN 3: TX.ATT.ONLY+;
,PIN 4: INT.WHFR+;
,PIN 5: TX.TA+;
,PIN 6: TX.EN.CLR+;
,PIN 7: SLDR.CTLLD−;
,PIN 8: TX.ATT.TEST+;
,PIN 9: LSSI.MM2+;
,PIN 12: SLDR.CIR.FREE+;
,PIN 13: TX.TXCHAN.FREE+;
,PIN 14: TX.TXE+;
,PIN 15: ATT.CT0−;
,PIN 16: ATT.CT1−;
,PIN 17: ATT.CT2−;
,PIN 18: CIR.FREE.INT+;
,PIN 19: TX.ATT−;
ATT.CT0:−
    (TX.ATT−*TX.ATT.TEST*SLDR.CIR.FREE*SMRESET−)+
    (TX.ATT−*TX.ATT.TEST*TX.TXCHAN.FREE*SMRESET−)+
    (ATT.CT0−*ATT.CT1*TX.ATT*TX.ATT.TEST−*SMRESET−)+
    (ATT.CT0−*ATT.CT2*TX.ATT*TX.ATT.TEST−*SMRESET−)+
    (ATT.CT0−*ATT.CT1−*ATT.CT2−*TX.ATT*TX.EN.CLR*TX.TXE−*TX.TA−);

TABLE 1-continued

Equations for PAL Chip SA95 (Acquire Logic)

```
ATT.CT1:—
    (ATT.CT1*ATT.CT0-*TX.ATT*SMRESET-)+
    (ATT.CT1-*ATT.CT0*TX.ATT*SMRESET-);
ATT.CT2:—
    (ATT.CT2*ATT.CT1-*TX.ATT*SMRESET-)+
    (ATT.CT2*ATT.CT0-*TX.ATT*SMRESET-)=
    (ATT.CT2-*ATT.CT1*ATT.CT0*TX.ATT*SMRESET-);
TX.TXE-:—
    (TX.ATT-*LSSI.MM2-)+
    (TX.ATT.ONLY*LSSI.MM2-)+
    (TX.EN.CLR*LSSI.MM2-)+
    (TX.TXE-*ATT.CT0-*LSSI.MM2-)+
    (TX.TXE-*ATT.CT1-*LSSI.MM2-)+
    (TX.TXE-*ATT.CT2-*LSSI.MM2-);
TX.ATT—
    (ATT.CT0*TX.ATT.TEST*SLDR.CIR.FREE*SLDR.CTL.LD-*SMRESET-)+
    (ATT.CT0*TX.ATT.TEST*TX.TXCHAN.FREE*SLDR.CTL.LD-*SMRESET-)+
    (TX.ATT*SLDR.CTL.LD-*SMRESET-*TX.EN.CLR-)+
    (TX.ATT*SLDR.CTL.LD-*SMRESET-*TX.TXE)+
    (TX.ATT*SLDR.CTL.LD-*SMRESET-*TX.TA)+
    (TX.ATT*SLDR.CTL.LD-*SMRESET-*ATT.CT2-);
CIR.FREE.INT—
    (INT.WH.FR-)+
    (SMRESET)+
    (SLDR.CTL.LD)+
    (SLDR.CIR.FREE-*CIR.FREE.INT-);
,END
```

After TXA.ATT+ is asserted, ATT.CT[0:2]+ count through eight states (as a binary counter), and TXA.TXE+ is asserted. Consequently, eight "0"'s are transmitted before the first flag so the receiver PLL has sufficient time to phase lock.

In order to minimize the time that the system module circuit $36_1$, $36_2$, ... $36_n$ occupies a communication circuit 22, a mechanism is preferably incorporated within the SLDR and the serial interface circuit $42_{1a,1b}$, $42_{2a,2b}$, ... $42_{na,nb}$ included in the associated system module circuit to automatically disable a driver from a channel. TXA.EN.CLR+ from the associated serial interface circuit $42_{1a,1b}$, $42_{2a,2b}$, ... $42_{na,nb}$ controls this function. If it is asserted, the DMA controller for the transmitter has completed operation. TXA.TXE+ is deasserted. The 2652 transmits the bytes that are stored within it, transmits the CRC and final flag, and then deasserts TXA.TA+. This causes TXA.ATT+ to be deasserted and the 75176 driver is disabled.

The acquire logic circuitry $43_{1a,1b}$, $43_{2a,2b}$, ... $43_{na,nb}$ is implemented in this fashion to minimize the probability that two or more system module circuits $36_1$, $36_2$, ... $36_n$ transmit on a channel at the same time. It is still possible for this to occur, but a number of conditions must first occur. The system module circuits $36_1$, $36_2$, ... $36_n$ must request to attach to the same communication circuit 22. Then the respective SLDR special control registers (which enable the associated acquire logic circuitry $43_{1a,1b}$, $43_{2a,2b}$, ... $43_{na,nb}$) within one bit period. Finally, the rising edges of the bit clocks must be within a certain window. This window is defined by the delay from the SLDR.TXA.CLK+ to TXA.ATT+ to the appropriate select signal to data being enabled on the communication circuit 22 through the receiver on the other system module circuit $36_1$, $36_2$, ... $36_n$ to SLDR.FRCT.CLR— to SLDR.FREE.CIR to TXA.ATT+(or through the receiver to TXA.TX-CHAN.FREE+ to TXA.ATT+). This window is smaller than 150 nanoseconds plus the transmitter delay and the receiver delay (approximately 300 nanoseconds total).

If an attempt to acquire a communication circuit 22 is unsuccessful, the programmed instructions can request an interrupt when the communication circuit becomes free. (This applies for a communication circuit test, not for a channel.) This function is also performed within the PAL integrated circuit SA95. It is enabled by a bit, SM.INT.WH.FRA+, in the control register SA89 shown in FIG. 3A. CIR.FREE.INT—, the actual interrupt signal, is generated as the output of an R-S flip-flop implemented within the PAL integrated circuit SA95 shown in FIG. 3B. When SM.INT.WH.FRA+ is asserted and SLDR.CIR.FREEA+ is asserted, an interrupt is generated (CIR.FREE.INTA— is asserted). This corresponds to setting the R-S flip-flop. The R-S flip-flop is reset by SM.RESET— or SLDR.CTL.LDA+ being asserted or by SM.INT.WH.FRA+ being deasserted.

The circuit select logic circuitry for PORT A is different from PORT B. This is because the PORT B only attaches to eight communication circuits 22 while PORT A attaches to sixteen.

With reference to FIG. 3D, SM.RCV.ENA[15:0]— are the receiver enable signals that determine which receivers to enable onto SM.RCV.CALLA+ and SM.RCV.ANSA+. They are generated by two 74LS138 integrated circuits SA43 shown in FIG. 3 and SA143 (not shown), which decode the signals SLDR.SEL.CIRA[3:0]+ in the control register.

As shown in FIG. 3C, SLDR.SEL.CIRA[3:0]+ are also inputs to four 745138 integrated circuits, SA44 and SA45 shown in FIG. 3C and SA144 and SA145 (not shown). The first 745138 integrated circuit SA45 is enabled by SM.RESET—*TXA.BERR—*TX-A.ATT*SM.SEL.CALLA. This function is generated by gates SA46 and SA47 and the enables of the 745138 integrated circuit SA45 and is used to generate SM.CALL.SELA[7:0]—. These signals are routed through inverters SA35–SA42 shown in FIG. 3C and enable the transmitter on the call channel of the selected communication circuit 22. There is a similar function for the 745138 integrated circuit SA145 for SM.CALL.SELA[15:8.

The second 745138 integrated circuit SA44 shown in FIG. 3D is enabled by SM.RESET−*TXA.BERR−*TXA.ATT*SM.SEL.CALLA−. This function is generated by the gates SA46 and SA47 and the enables of the 745138 integrated circuit SA44 and is used to generate SM.ANS.SELA[7:0]−. These signals are routed through inverters SA27–SA34 and enable the transmitter on the answer channel of the selected communication circuit 22. There is a similar function for the 745138 integrated circuit SAl44 for SM.ANS.SELA[15:8].

If the programmed instructions command acquisition of a communication circuit 22 (channel), acquisition is performed in the following manner. Firstly, the appropriate control bits are written into the control register. Secondly, a pause the equivalent of sixteen bit times occurs, and the SLDR acquire trigger location is read (described below). Thirdly, a pause of two bit times occurs, and the SLDR acquire trigger location is read again. Fourthly, the status register is read and decoded to determine if the transmitter is connected to the communication circuit 22 (channel). This does not affect whether the SLDR circuitry has successfully acquired the communication circuit 22 (channel) but is a test that is logically needed. This triggers the associated acquire logic circuitry $43_{1a,1b}$, $43_{2a,2b}$, . . . $43_{na,nb}$, that is, the hardware acquires the communication circuit if the communication circuit is free.

Reading the acquire trigger location can have a side effect in the hardware. If the control register has been written in such a way that a communication circuit 22 (channel) can be attached, then reading the status register enables the hardware to attempt the attach. This means that the location is not read for at least the equivalent of 15 bit times after the loading of the control register. After two more bit times, this location is read again.

At any time up to this last read, the 68B44 DMA controller can be programmed. Any time after the DMA controller has been set up, the bits in the special control register included in the associated serial interface circuit $42_{1a,1b}$, $42_{2a,2b}$, . . . $42_{na,nb}$ can be set, including the activate bit. After the activate bit has been set to "1" and the communication circuit 22 (channel) has been acquired, the hardware starts. If the communication circuit 22 (channel) has been acquired and the activate bit has not been set to "1", then first flags are transmitted over the communication circuit channel after eight "0"s are transmitted. The eight "0"s are transmitted to allow PLL synchronization.

The acquire logic circuitry $43_{1a,1b}$, $43_{2a,2b}$, . . . $43_{na,nb}$ includes various features. The more salient features are as follows.

One state of the differential transceiver circuitry lines is defined as idle. This state is guaranteed by circuit terminators when all drivers of that communication circuit 22 are disabled. Idle is defined as being undriven for a minimum of eight microseconds.

The acquire logic circuitry $43_{1a,1b}$, $43_{2a,2b}$, . . . $43_{na,nb}$ includes hardware to automatically detect if the communication circuit 22 to which it is connected is idle (an idle communication circuit is also called free).

The major function of the acquire logic circuitry $43_{1a,1b}$, $43_{2a,2b}$, . . . $43_{na,nb}$ is to prevent two system module circuits $36_1$, $36_2$, . . . $36_n$ from driving the same communication circuit 22 at the same time. This is done by the acquire logic circuitry $43_{1a,1b}$, $43_{2a,2b}$, . . . $43_{na,nb}$ that is being directed to drive a channel on a communication circuit 22 use its idle detect logic (which is constantly listening to the circuit) to prevent it from driving the channel, at the last possible instant. This last possible instant is defined by the delays in various logic circuits.

The acquire logic circuitry $43_{1a,1b}$, $43_{2a,2b}$, $43_{na,nb}$ can listen only to the channel that is to be transmitted on, rather than both channels of a communication circuit 22. This is useful in the following situation. System module circuit $36_1$ transmits a message to system module circuit $36_2$ on the call channel of a communication circuit 22. At the same time system module $36_3$ transmits a message to system module circuit $36_4$ on the answer channel of the same communication circuit 22. Let us assume that both system module circuits $36_1$ and $36_3$ acquired the communication circuit 22 successfully. This is actually a collision, but at this point, none of the system module circuits $36_1$–$36_4$ involved can determine this. When system module circuit $36_2$ wants to respond to system module circuit $36_1$, the system module circuit $36_2$ acquires. However, instead of listening to both channels in the acquire process, the system module circuit $36_2$ acquires based on listening to only the answer channel (since system module circuit $36_1$ is already transmitting on the call channel). Since system module circuit $36_3$ is on the answer channel, the acquire process fails. The same is true when system module circuit $36_4$ attempts to acquire. Thus, the collision is detected earlier than otherwise, thereby saving bandwidth and processing time.

The collision window is the time from one system module circuit $36_1$, $36_2$, . . . $36_n$ acquiring a communication circuit 22 to any other system module circuit recognizing this and being able to prevent that module from also acquiring the communication circuit, thereby causing a collision. The entire acquire mechanism, and the hardware implementation, has been configured around minimizing this time. The smaller this time is, then, probablistically, the lower will be the number of collisions that occur. Referring to FIG. 3, assume that the hardware is being commanded to drive the channel "call 0". The collision window is defined as the sum of the following times. The times are the same for any channel.

(a) The delay from pin 9 or pin 12 on SA95 shown in FIG. 3B to pin 19 (the attach signal which causes the system module circuit $36_1$, $36_2$, . . . $36_n$ to drive the backplane).

(b) The delay from pin 5 on SA45 shown in FIG. 3C to pin 15.

(c) The delay through the inverter SA35 shown in FIG. 3C.

(d) The delay from pin 3 of SA09 shown in FIG. 3E to the output being valid on pins 7 and 6.

(e) The electrical delay down the backplane.

(f) The delay from pins 7 and 6 of SA09 to pin 1 of that integrated circuit.

(g) The delay from pin 4 of SA87 shown in FIG. 3A to pin 6.

(h) The delay from pin 1 of the counter (the asynchronous clear input) to the RCO output on pin 15 of SA93 shown in FIG. 3B. The use of an asynchronous clear counter is helpful in providing a minimal collision window.

The sum of these times impacts the probability of collisions on the backplane and therefore, the possible backplane performance.

Another feature of the acquire mechanism is the automatic disconnect feature of the transmitter. Programmed instructions command the acquire logic circuitry to automatically disconnect the transmitter after the transmission is complete. When the hardware detects that the transmitter has completed the transfer, it disables the transmitter from the communication circuit 22. This is accomplished by detecting when the hardware has signalled the 2652 that the last byte is to be transmitted, and the 2652 signals that it has completed the transfer. The hardware pauses eight bit times so the flag that is being transmitted finishes. If this mechanism were not available, the processor associated with the system module circuit $36_1$, $36_2$, ... $36_n$ would have to receive an interrupt and then turn off the driver. During this time, the communication circuit 22 would be unavailable to other system module circuits. This feature is especially useful in saving backplane bandwidth.

Writing into the register that controls the CIRCUIT NUMBER automatically unacquires the acquire logic circuitry $43_{1a,1b}$, $43_{2a,2b}$, ... $43_{na,nb}$, thereby disabling the hardware from driving the new communication circuit 22. This prevents unintended collisions which decrease the effective total backplane bandwidth.

In operation, communication of digital information over the dual speed serial digital information communication network 10 is initiated by a user request entered by means of an information processing element. The digital information communication sequence includes a message phase and can, but does not necessarily, include a data exchange phase as shown in FIG. 7.

Briefly, as shown in FIG. 7, a user enters a request or other information, indicated as the REQUEST, by means of an information processing element. The system module circuit $36_1$, $36_2$, ... $36_n$ included in the respective server means $20_1$, $20_2$, ... $20_n$ connected to the information processing element assembles and transmits a message, indicated as the MESSAGE, to another server means in response to the REQUEST. The system module circuit $36_1$, $36_2$, ... $36_n$ included in the respective server means $20_1$, $20_2$, ... $20_n$ which receives the MESSAGE transmits a response message, indicated as the ACKNOWLEDGEMENT, back to the server means which transmitted the original MESSAGE. Thereafter, data, indicated as the DATA, can be transmitted from the personality module circuit $26_1$, $26_2$, ... $26_n$ included in the respective server means $20_1$, $20_2$, ... $20_n$ which transmitted the original MESSAGE to the personality module circuit which received the MESSAGE, or vice versa.

By way of example, the operation of the dual speed serial digital information communication network 10 will be considered in greater detail in connection with digital communication between one of the local user terminals 14 and the add-on memory 18 shown in FIG. 1. With reference to FIG. 2, during the message phase, the personality module circuit $26_2$ included in the server means $20_2$ interfaced to the local user terminals 14 generates a user request in response to information entered by a user by means of one of the local user terminals, which interrupts the associated system module circuit $36_2$ included in the server means. Next, the interrupted system module circuit $36_2$ assembles the appropriate message in the memory associated with the system module circuit. The message is determined by the information from the personality module circuit $26_2$ transferred to the associated system module circuit $36_2$ immediately after the interrupt. Such information can indicate, for example, that the personality module circuit $26_2$ needs a page of data not stored in the memory associated with the personality module circuit (i.e., needs a page of data retrieved from the add-on memory 18).

Meanwhile, the processor associated with the system module circuit $36_2$ which is to initiate communication of a message during the message phase instructs the acquire logic circuitry $43_{2a}$ included in the multiplexer circuit $44_{2a}$ of the associated low speed serial interface $38_{2a}$ to monitor the home communication channel or circuit for the server means $20_1$ interfaced to the add-on memory 18 to which the message is to be transmitted in order to determine whether or not that home circuit is available. This avoids the need for having the processor associated with the system module circuit 362 poll the home communication channel or circuit and, therefore, frees the processor for other tasks, such as responding to messages from other server means while in a wait mode (i.e., while the system module circuit must itself wait in order to transmit a message). If the home communication channel or circuit for the server means $20_1$ to which the message is to be transmitted is available, that home circuit is acquired by the acquire logic circuitry $43_{2a}$ included in the multiplexer circuit $44_{2a}$ of the associated low speed serial interface $38_{2a}$ included in the system module circuit 362 of the associated server means which is to initiate communication, and the processor associated with the system module circuit commences communication by initiating the DMA $40_{2a}$, whereupon the assembled message is accessed by the DMA and routed by the associated serial interface circuit $42_{2a}$ and the associated multiplexer circuit onto the four-wire, full duplex communication channel $46_1$, $46_2$, ... $46_m$ which is the home circuit for the server means $20_1$ to which the message is transmitted. Transmission of the message is commenced when the processor associated with the system module circuit $36_2$ initiates the associated DMA $40_{2a}$. Transmission of the message occurs at a first or message rate, for example, two megabits per second.

On the other hand, the home communication channel or circuit for the server means $20_1$ to which the message is to be transmitted can be unavailable, that is, busy.

In one embodiment in accordance with the invention, the acquire logic circuitry $43_{2a}$ included in the multiplexer circuit $44_{2a}$ of the associated low speed serial interface $38_{2a}$ included in the system module circuit 362 of the associated server means $20_2$ which is to initiate communication under control of programmed instructions from the processor associated with the system module circuit detects the availability of the home communication channel or circuit of the server means $20_1$ to which the message is to be transmitted. If the home communication channel or circuit of the server means $20_1$ to which the message is to be transmitted is available, the message is transmitted as described immediately above. If the home communication channel or circuit of the server means $20_1$ is not available, that is, busy, the acquire logic circuitry $43_{2a}$ included in the multiplexer circuit $44_{2a}$ of the associated low speed serial interface $38_{2a}$ included in the system module circuit 362 of the associated server means $20_2$ which is to initiate communication can be reinitiated at a later time under control of further programmed instructions from the processor associated with the system module circuit to acquire the home circuit detected initially to have been busy, or, alternatively, another communication channel or circuit.

In another contemplated embodiment in accordance with the invention, the acquire logic circuitry $43_{2a}$ included in the multiplexer circuit $44_{2a}$ of the associated low speed serial interface $38_{2a}$ included in the system module circuit $36_2$ of the associated server means $20_2$ which is to initiate communication continuously monitors the home communication channel or circuit of the server means $20_1$ to which the message is to be transmitted for a predetermined period, acquires that home circuit if the home circuit becomes available during the predetermined period, and interrupts the processor associated with the system module circuit when that home circuit is available. If the home communication channel or circuit of the server means $20_1$ to which the message is to be transmitted is or becomes available during the predetermined period, the message is transmitted mitted as described immediately above. The processor associated with the system module circuit $36_2$ can time the predetermined period. The predetermined period can be, for example, several seconds. During the predetermined period the interrupt for the processor associated with the system module circuit $36_2$ is enabled. If an interrupt occurs during the predetermined period, the message is transmitted. If an interrupt does not occur during the predetermined period, the processor associated with the system module circuit $36_2$ can instruct the acquire logic circuitry $43_{2a}$ included in the multiplexer circuit $44_{2a}$ of the associated low speed serial interface $38_{2a}$ to select an alternative four-wire, full duplex communication channel $46_1, 46_2, \ldots 46_m$. Preferably, the alternative four-wire, full duplex communication channel $46_1, 46_2, \ldots 46_m$ is the master communication channel or circuit.

The low speed serial interfaces $38_{1b}, 38_{2b}, \ldots 38_{nb}$ included in the respective system module circuits $36_1, 36_2, \ldots 36_n$ monitor the master communication channel or circuit when no other operations are being performed which involve the use of the interfaces, for example, receipt of another message from another system module circuit while involved with transmission of a message to yet another system module circuit. Consequently, if the home communication channel or circuit for the server means $20_1$ to which a message is to be transmitted is busy, the system module circuit $36_2$ of the server means which is to initiate communication preferably attempts to acquire the master communication channel or circuit. If for any reason the master communication channel or circuit cannot be acquired, the processor associated with system module circuit $36_2$ can instruct the acquire logic circuitry $43_{2a}$ included in the multiplexer circuit $44_{2a}$ of the associated low speed serial interface $38_{2a}$ to select yet another alternative four-wire, full duplex communication channel $46_1, 46_2, \ldots 46_m$. As will be described shortly, an address included in the message assures that the message is responded to only by the server means $20_1$ to which the message is to be transmitted.

As mentioned earlier, one of the system module circuits $36_1, 36_2, \ldots 36_n$ is in the form of a health monitor means for ascertaining the operability of the elements of the dual speed serial digital information communication network 10. In the event that the home communication channel or circuit for the server means $20_1$ to which the message is to be transmitted is busy, the system module circuit $36_2$ which is to initiate communication either transmits a message to the system module circuit which serves as the health monitor means or, where the system module circuit which is to initiate communication is the health monitor, the system module circuit is advised by the acquire logic circuitry $43_{2a}$ included in the multiplexer circuit $44_{2a}$ of the associated serial interface $38_{2a}$ that the home circuit is busy. Subsequently, a test is undertaken for checking the operability of the busy four-wire, full duplex communication channel $46_1, 46_2, \ldots 46_m$ and the server means $20_1$ to which the message is to be transmitted as a special case of the periodic test performed by the health monitor means as will be described later.

The message format is illustrated in FIG. 8A. The message format is based on the HDLC digital communication protocol.

The message includes a first flag 50 which indicates a message. The first flag 50 preferably comprises an eight-bit byte. When the acquire logic circuitry $43_{2a}$ included in the multiplexer circuit $44_{2a}$ of the associated low speed serial interface $38_{2a}$ included in the system module circuit $36_2$ of the associated server means $20_2$ which is to initiate communication of a message over the home communication channel or circuit for the server means to which the message is to be transmitted acquires the home circuit, the acquire logic circuitry provides a stream of first flags 50 on that home circuit in order to maintain availability of the home circuit for transmission of the message.

Referring again to FIG. 8A, an address 52 follows the first flag 50 for designating the server means $20_1$ to which the message is transmitted. Preferably, the address 52 comprises an eight-bit byte.

A message 54 follows the address 52. The message 54 can comprise, for example, any number of eight-bit bytes, but preferably not more than 256 bytes, for conveying a request or other information to the server means $20_1$ to which the message is transmitted. Often, as in the example, the message 54 requests data exchange between the server means $20_2$ which transmits the message and the server means $20_1$ which receives the message.

The message 54 is followed by a CRC code 56. The CRC code 56 is preferably sixteen bits (i.e., two bytes). The CRC code 56 is preferably a CRC-16 style of cyclic redundancy check code rather than a CCITT-16 style as employed in the known HDLC digital communication protocol. Basically, the CRC-16 cyclic redundancy check code 56 is based on a different starting value and calculation than a CCITT-16 cyclic redundancy check code. The use of the CRC-16 cyclic redundancy check code 56 instead of a CCITT-16 cyclic redundancy check code reduces the complexity of the circuit implementation.

As shown in FIG. 8A, the message concludes with a second flag 58 which indicates the end of the record. Preferably, the second flag 58 comprises an eight-bit byte.

Referring again to the operation of the dual speed serial digital information communication network 10, the low speed serial interface $38_{1a}$ included in the respective system module circuit $36_1$ of the associated server means $20_1$ to which the message is transmitted continuously monitors the home communication channel or circuit for the server means. The address 52 shown in FIG. 8A is detected by the system module circuit $36_1$ within the message which appears on one of the four-wire, full duplex communication channels $46_1, 46_2, \ldots 46_m$ included in the communication circuits 22, preferably the home communication channel or circuit for the server means $20_1$ to which the message is transmitted. Consequently, the low speed serial interface $38_{1a}$ included in the system module circuit $36_1$ of the associated server means $20_1$ to which the message is transmitted responds to the message. The DMA $40_{1a}$ included in the low speed serial interface $38_{1a}$ routes the message from the associated serial interface circuit $42_{1a}$ received from the associated multiplexer circuit $44_{1a}$ to the memory associated with the system module circuit $36_1$ included in the server means $20_1$ to which the message is transmitted and interrupts the processor associated with the system module circuit in order to indicate that a message has been received. Subsequently, the system module circuit $36_1$ included in the server means $20_1$ which receives the message transmits an acknowledgement message over the four-wire, full duplex communication channel $46_1, 46_2, \ldots 46_m$ included in the communication circuits 22 of the home communication channel or circuit for the server means which receives the original message. The acknowledgement message preferably has the same format as the original message shown in FIG. 8A.

The second flag 58 included in the acknowledgement message represents the conclusion of the message phase. In some cases, the acknowledgement message also represents the end of communication of digital information between the server means $20_2$ which initiated the message phase and transmitted the original message and the server means $20_1$ which received the original message. In other instances, as in the example, however, the digital information contained in the message 54 shown in FIG. 8A indicates that data is to be exchanged between the server means $20_1$ which received the original message and the server means $20_2$ which transmitted the original message, whereupon data is exchanged at the second higher rate.

The transmission of data from the server means $20_1$ which received the original message to the server means $20_2$ which transmitted the original message as in the example, or vice versa, at the second higher rate requires that a message has been received by the server means to which the original message was transmitted and that the server means has returned an acknowledgement message to the server means which transmitted the original message. The original message from the server means $20_2$ which transmitted the original message selects the four-wire, full duplex communication channel $46_1, 46_2, \ldots 46_m$ included in the communication circuits 22 and, further, assures that the selected communication channel is acquired for the transmission of data. The identification of the four-wire, full duplex communication channel $46_1, 46_2, \ldots 46_m$ over which data exchange is to occur is included in the message 54 shown in FIG. 8A.

The system module circuit $36_2$ included in the server means $20_2$ which transmitted the original message at the first rate communicates to the system module circuit of the server means $20_1$ which received the message that a data exchange is to occur and that data transmission is awaited. The system module circuits $36_1$ and $36_2$ included in the respective server means $20_1$ and $20_2$ between which data is to be exchanged initiate the associated personality module circuits $26_1$ and $26_2$ between which the data is transmitted and received.

There are only two cases for data exchange, namely, where the system module circuit $36_2$ included in the server means $20_2$ requests data exchange to the associated personality module circuit $26_2$ as in the example and, on the other hand, where the system module circuit indicates that the associated personality module circuit is to transmit data. In the former case, that is, where the system module circuit $36_2$ included in the server means $20_2$ which transmitted the original message indicates that the associated personality module circuit $26_2$ is to receive data, then the system module circuit initiates the associated personality module circuit so that the personality module circuit is in condition to receive digital information in the form of data from the server means $20_1$ which received the original message upon completion of the transmission of the original message at the first rate. (In the latter case, that is, where the personality module circuit $26_1$ included in the server means $20_1$ which received the original message is to receive data, then the associated system module circuit $36_1$ does not transmit an acknowledgement message in response to the original message until the associated personality module circuit is in condition to receive the digital information in the form of data at the second higher rate.)

The format for the digital information in the form of data is shown in FIG. 8B. A comparison between the format for the data shown in FIG. 8B and the format for the original message shown in FIG. 8A indicates that the formats have a similar form with two exceptions.

The data format includes a first flag 60 which is preferably eight bits and is similar to the first flag 50 which appears in the message format. Unlike the message, however, which includes the address 52, the data format does not include an address. Furthermore, the data 62 shown in FIG. 8B can be substantially larger than the message 54 included in the message format shown in FIG. 8A. Specifically, whereas the message 54 shown in FIG. 8A is preferably not greater than 256 bytes, the data 62 is preferably as many as 16,636 bytes as shown in FIG. 8B. By way of similarity, the data format shown in FIG. 8B includes a CRC code 64 and a second flag 66 which correspond to the CRC code 56 and the second flag 58 which appear in the message format shown in FIG. 8A.

As can be seen from a comparison of FIG. 8B with FIG. 8A, the substantially greater amount of digital information which can be contained in the data 62 in comparison with the digital information contained in the message 54 militates in favor of a higher rate for data transmission than for message transmission. Furthermore, elimination of the address 52 included in the message format shown in FIG. 8A enables a reduction in the complexity of circuit implementation and an increase in the rate of data transmission.

The acquire logic circuitry $43_{2a}$ included in the multiplexer circuit $44_{2a}$ of the associated low speed serial interface $38_{2a}$ included in the system module circuit $36_2$ which initiates data exchange by means of the original message transmits a series of first flags over the selected four-wire, full duplex communication channel $46_9, 46_{10}, \ldots 46_{16}$ included in the communication circuits 22 selected for data transmission in order to continue the availability of the selected communication channel for data exchange. Thereafter, the system module circuit $36_2$ included in the server means $20_2$ initiates the high speed serial interface $28_2$ of the associated personality module circuit $26_2$, which transmits flags on the selected four-wire, full duplex communication channel $46_9, 46_{10}, \ldots 46_{16}$ included in the communication circuits 22, whereupon the system module circuit disables the low speed serial interface $38_{2a}$.

Data transmission commences when the processor associated with the system module circuit $36_1$ included in the server means 20 which is to transmit data initiaates the DMA $30_1$ included in the associated high speed serial interface $28_1$, whereupon the data is accessed by the DMA and routed by the associated serial interface circuit $32_1$ and multiplexer circuit $34_1$ onto the four-wire, full duplex communication channel $46_9$, $46_{10}$, ... $46_{16}$ included in the communication circuits 22, which is selected for data transmission and identified in the original message. The DMA $30_1$ included in the personality module circuit $26_1$ of the associated server means $20_1$ which transmits the data interrupts the processor associated with the system module circuit when the data transmission is complete as indicated by the second flag 66 shown in FIG. 8B. Second flags 66 are transmitted at the end of the data transmission (i.e., after the CRC code 64) until the serial interface circuit $32_1$ included in the personality module circuit $26_1$ of the associated server means $20_1$ which transmits the data is disabled. The DMA $30_2$ included in the personality module circuit $26_2$ of the associated server means $20_2$ which receives the data interrupts the processor associated with the system module circuit when the data transmission is complete as indicated by the second flag 66. This completes the data exchange phase shown in FIG. 7.

As mentioned earlier, one of the system module circuits $36_1$, $36_2$, ... $36_n$ preferably serves as a health monitor means for periodically testing the elements of the dual speed serial digital information communication network 10, as well as testing a particular four-wire, full duplex communication channel $46_1$, $46_2$, ... $46_m$ and system module circuit to which a message is to be transmitted if the communication channel remains busy, whereupon the health monitor means is notified. Periodically, the health monitor means tests the master communication channel or circuit by transmitting a message to each and every server means $20_1$, $20_2$, ... $20_n$ and awaiting an acknowledgement message from each system module circuit $36_1$, $36_2$, ... $36_n$ included in the respective server means. If the health monitor means does not receive an acknowledgement message from a system module circuit $36_1$, $36_2$, ... $36_n$, then the health monitor means transmits a message to that system module circuit over the home communication channel or circuit for the server means associated with that system module circuit. The message from the health monitor means instructs the system module circuit $36_1$, $36_2$, ... $36_n$ to monitor the master communication channel or circuit, whereupon the health monitor again attempts to communicate with the system module circuit over the master circuit.

If an acknowledgement message is not received, the health monitor means continues the attempt to communicate with the system module circuit $36_1$, $36_2$, ... $36_n$ over each of the four-wire, full duplex communication channels $46_1$, $46_2$, ... $46_m$ until all channels are exhausted. If no acknowledgement message is received by the health monitor means, the system module circuit $36_1$, $36_2$, ... $36_n$ is presumed faulty. If the system module circuit $36_1$, $36_2$, ... $36_n$ acknowledges the message from the health monitor means to monitor the master communication channel or circuit, but the re-attempt of communication over the master circuit is not successful, then either the master circuit is faulty or the connection of the system module circuit to the master circuit is defective. If subsequent tests evidence that acknowledgement messages are received by the health monitor means over the master communication channel or circuit from other system module circuits $36_1$, $36_2$, ... $36_n$, the connection is deemed defective. If no acknowledgements are received during subsequent tests, then the master communication channel or circuit is deemed faulty.

In summary, the dual speed serial digital information communication network 10 provides high throughput fault tolerant serial digital information communication. The plurality of four-wire, full duplex communication channels $46_1$, $46_2$, ... $46_m$ in association with the personality module circuits $26_1$, $26_2$, ... $26_n$ and the system module circuits $36_1$, $36_2$, ... $36_n$ provide communication channel multiplication for increased message and data throughput, preferably with messages being communicated at a first rate and data being communicated at a second higher rate in order to optimize throughput. The four-wire, full duplex communication channels $46_1$, $46_2$, ... $46_m$ not only provide alternate communication channels in the event that one or more are busy so as to increase message and data throughput, but also provide fault tolerance by having redundant communication channels in the event that one or more are short circuited or open circuited or otherwise fail.

The information processing elements connected to the server means $20_1$, $20_2$, ... $20_n$ can be serial, parallel, serial to parallel, or parallel to serial. The personality module circuits $26_1$, $26_2$, ... $26_n$ and system module circuits $36_1$, $36_2$, ... $36_n$ included in the respective server means $20_1$, $20_2$, ... $20_n$ assure that digital information to be communicated is in parallel format for input to the serial interfaces $28_1$, $28_2$, ... $28_n$ included in the respective personality module circuits and $38_{1a,1b}$, $38_{2a,2b}$, ... $38_{na,nb}$ included in the respective system module circuits for serial communication over the four-wire, full duplex communication channels $46_1$, $46_2$, ... $46_m$ included in the communication circuits 22.

Only one low speed serial interface is needed in each system module circuit $36_1$, $36_2$, ... $36_n$ although preferably two are included in order to facilitate operation and improve performance. Furthermore, a protocol other than HDLC can be used, although HDLC is preferably used.

Although the invention has been described and illustrated in detail, it is to be clearly understood that the same is by way of illustration and example only and is not to be taken by way of limitation. Various modifications will occur to those skilled in the art in view of the embodiments which are described above. Consequently, the spirit and scope of this invention are ascertainable only by reference to the appended claims.

What is claimed is:

1. A method for digital information communication whereby at least one of a plurality of information processing elements is coupled to at least one other of the plurality of information processing elements, comprisng the steps of:
  interfacing each of the plurality of information processing elements to a plurality of coupling means connected to at lest one communication circuit;
  interfacing each of a plurality of communication controller means associated with the plurality of coupling means to the communication circuit;
  initiating communication circuit acquisition means included in the communication controller means in response to a control signal produced by a processor included in the communication controller means when access to the communication circuit is needed for communication of digital information from the one information processing element to another;

releasing the processor to perform other data processing functions;

detecting the availability of the communication circuit by means of the communication circuit acquisition means;

acquiring the communication circuit under control of the communication circuit acquisition means for transmission of digital information over the communication circuit;

maintaining availability of the communication circuit under control of the communication circuit acqusition means for transmission of digital information over the communication circuit; and initiating transmission of digital information over the communication circuit acquired by the communication circuit acquisition means under control of the processor.

2. The method of claim 1, further comprising the steps of:

initiating the communication circuit acquisition means in response to a second control signal produced by the processor at the conclusion of transmission of digital information; and releasing the communication circuit in response to the second control signal under control of the communication circuit acquisition means.

3. The method of claim 1, further comprising the steps of:

detecting an end of record flag included in the transmitted digital information by means of the communication circuit acquisition means; and releasing the communication circuit in response to the end of record flag under control of the communication circuit acquisition means;

whereby the communication circuit acquisition means automatically releases the communication circuit.

4. The method of claim 1, further comprising the steps of:

exchanging digital information in the form of messages among the plurality of communication controller means under control of the plurality of communication controller means, at least certain of the messages exchanged among the plurality of communication controller means being for control of the exchange of digital information in the form of data among the plurality of coupling means for use by the plurality of information processing elements; and connecting the plurality of coupling means and communication controller means to a plurality of four-wire, full duplex communication circuits for transferring digital information among the plurality of coupling means and communication controller means, respectively, in bit-serial format;

whereby high throughput fault tolerant digital information communication in serial format is provided.

5. The method of claim 4 wherein the exchange of messages comprises bidirectionally communicating digital information at a first rate and the exchange of data comprises unidirectionally communicating digital information at a second higher rate.

6. A method for digital information communication whereby at least one of a plurality of information processing elements is coupled to at least one other of the plurality of information processing elements, comprising the steps of:

interfacing each of the plurality of information processing elements to a plurality of coupling means connected to at least one communication circuit;

initiating communication circuit acquisition means included in communication controller means in response to a control signal produced by a processor included in the communication controller means when access to the communication circuit is needed for communication of digital information from the one information processing element to the other;

releasing the processor to perform other data processing functions;

monitoring the communication circuit by means of the communication circuit acquisition means;

detecting the availability of the communication circuit by means of the communication circuit acquisition means;

acquiring the communication circuit under control of the communication circuit acquisition means for transmission of digital information over the communication circuit;

maintaining availability of the communication circuit under control of the communication circuit acquisition means for transmission of digital information over the communication circuit;

interrupting the processor upon acquisition of the communication circuit in response to an interrupt signal produced by the communication circuit acquisition means; and initiating transmission of digital information over the communication circuit acquired by the communication circuit acquisition means in response to the interrupt signal under control of the processor.

7. The method of claim 6, further comprising the steps of:

initiating the communication circuit acquisition means in response to a second control signal produced by the processor at the conclusion of transmission of digital information; and releasing the communication circuit in response to the second control signal under control of the communication circuit acquisition means.

8. The method of claim 6, further comprising the. steps of:

detecting an end of record flag included in the transmitted digital information by means of the communication circuit acquisition means; and releasing the communication circuit in response to the end of record flag under control of the communication circuit acquisition means;

whereby the communication circuit acquisition means automatically releases the communication circuit.

9. The method of claim 6, further comprising the steps of:

exchanging digital information in the form of messages among the plurality of communication controller means under control of the plurality of communication controller means, at least certain of the messages exchanged among the plurality of communication controller means being for control of the exchange of digital information in the form of data among the plurality of coupling means for use by the plurlaity of information processing elements; and connecting the plurality of coupling means and communication controlling means to a plurality of four-wire, full duplex communcation circuits for transferring digital information among the plurality of coupling means and communication controller means, respectively, in bit-serial format;

whereby high throughput fault tolerant digital information communication in serial format is provided.

10. The method of claim 9 wherein the exchange of messages comprises bidirectionally communicating digital information at a first rate and the exchange of data comprises unidirectionally communicating digital information at a second higher rate.

11. Apparatus for digital information communication whereby at least one of a plurality of information processing elements is coupled to at least one other of the plurality of information processing elements, comprising:

means for interfacing each of the plurality of information processing elements to a plurality of coupling means connected to a communication circuit;

means for interfacing each of a plurality of communication controller means associated with the plurality of coupling means to the communication circuit;

a processor included in the communication controller means for producing a control signal when access to the communication circuit is needed for communication of digital information from the one information processing element to another; and communication circuit acquisition means included in the communication controller means responsive to the control signal for acquiring the communication circuit, the communication circuit acquisition means maintaining availability of the communication circuit for transmission of digital information over the communication circuit, thereby releasing the processor to perform other data processing functions;

the processor initiating transmission of digital information over the communication circuit acquired by the communication circuit acquisition means.

12. The apparatus of claim 11 wherein the processor produces a second control signal for initiating the communication circuit acquisition means at the conclusion of transmission of digital information and the communication circuit acquisition means is responsive to the second control signal for releasing the communication circuit.

13. The apparatus of claim 11 wherein the communication circuit acquisition means detects an end of record flag included in the transmitted digital information and releases the communication circuit in response to the end of record flag, whereby the communication circuit acquisition means automatically releases the communication circuit.

14. The apparatus of claim 11 wherein there is a plurality of four-wire, full duplex communication circuits, the plurality of coupling means interfaces each of the plurality of information processing elements to the plurality of communication circuits in order to exchange digital information in the form of data among the plurality of coupling means for use by the plurality of information processing elements, the plurality of communication controller means is connected to the plurality of coupling means for exchanging digital information in the form of messages among the plurality of communication controller means, at least certain of the messages exchanged among the plurality of communication controller means being for control of the exchange of data among the plurality of coupling means, and further comprising serial interface means for connecting the plurality of coupling means and communication controller means to the plurality of communication circuits for transferring digital information among the plurality of coupling means and communication controller means, respectively, in bit-serial format, thereby providing high throughput fault tolerant digital information communication in serial format.

15. The apparatus of claim 14 wherein the plurality of communication circuits forms a set of communication circuits for bidirectionally communicating digital information in the form of messages at a first rate and characterized in that a predetermined subset of the communication circuits is provided for unidirectionally communicating digital information in the form of data at a second higher rate.

16. Apparatus for digital information communication whereby at least one of a plurality of information processng elements is coupled to at least one other of the plurality of information processing elements, comprising:

means for interfacing each of the plurality of information processing elements to a plurality of coupling means connected to a communication circuit;

means for interfacing each of a plurality of communication controller means associated with the plurality of coupling means to the communication circuit;

a processor included in the communication controller means for producing a control signal when access to the communication circuit is needed for communication of digital information from the one information processing element to another;

communication circuit acquisition means included in the communication controller means responsive to the control signal for acquiring the communication circuit, the communication circuit acquisition means maintaining availability of the communication circuit for transmission of digital information over the communication circuit, thereby releasing the processor to perform other data processing functions;

the communication circuit producing an interrupt signal when the communication circuit is acquired by the communication circuit acquisition means; and the processor being responsive to the interrupt signal for initiating transmission of digital information over the communication circuit acquired by the communication circuit acquisition means.

17. The apparatus of claim 16 wherein the processor produces a second control signal for initiating the communication circuit acquisition means at the conclusion of transmission of digital information and the communication circuit acquisition means is responsive to the second control signal for releasing the communication circuit.

18. The apparatus of claim 16 wherein the communication circuit acquisition means detects an end of record flag included in the transmitted digital information and releases the communication circuit in response to the end of record flag, whereby the communication circuit acquisition means automatically releases the communication circuit.

19. The apparatus of claim 16 wherein there is a plurality of four-wire, full duplex communication circuits, the plurality of coupling means interfaces each of the plurality of information processing elements to the plurality of communication circuits in order to exchange digital information in the form of data among the plurality of coupling means for use by the plurality of information processing elements, the plurality of communication controller means is connected to the plurality of coupling means for exchanging digital information in the form of messages among the plurality of communication controller means, at least certain of the messages exchanged among the plurality of communication controller means being for control of the exchange of data among the plurality of coupling means, and further comprising serial interface means for connecting the plurality of coupling means and communication controller means to the plurality of communication circuits for transferring digital information among the plurality of coupling means and communication controller means, respectively, in bit-serial format, thereby providing high throughput fault tolerant digital information communication in serial format.

20. The apparatus of claim 19 wherein the plurality of communication circuits forms a set of communication circuits for bidirectionally communicating digital information in the form of messages at a first rate and characterized in that a predetermined subset of the communication circuits is provided for unidirectionally communicating digital information in the form of data at a second higher rate.

21. A digital information communication network whereby at least one of a plurality of information processing elements is loosely coupled to at least one other of the plurality of information processing elements, comprising:

a plurality m of four-wire, full duplex communication channels;

a plurality n of personality module circuits connected to the plurality of information processing elements and a preselected subset of the m communication channels for interfacing the plurality of information processing elements to the preselected subset of the m communication channels in order to exchange digital information in the form of data among the n personality module circuits, each one of the n personality module circuits including a first serial interface comprising:

(a) a first direct memory access interface in series with
(b) a first serial interface circuit in series with
(c) a first multiplexer circuit;

the first serial interface for connecting the associated personality module circuit to the preselected subset of the m communication channels; and a plurality n of system module circuits connected to the m communication channels and the n personality module circuits for exchanging digital information in the form of messages among the n system module circuits, at least certain of the messages exchanged among the n system module circuits being for control of the exchange of data among the n personality module circuits, each one of the n system module circuits including at least a second serial interface comprising:

(a) a second direct memory access interface in series with
(b) a second serial interface circuit in series with
(c) a second multiplexer circuit including acquire logic circuitry for acquiring one of the m communication channels;

the second serial interface for connecting the associated system module circuit to the m communication channels;

the data and messages being exchanged among the n personality module circuits and n system module circuits, respectively, in bit-serial format;

thereby providing high throughput fault tolerant digital information communication in serial format.

22. The apparatus of claim 21 wherein the m communication circuits form a set of communication circuits for bidirectionally communicating digital information in the form of messages at a first rate and characterized in that a predetermined subset of the m communication circuits is provided for unidirectionally communicating digital information in the form of data at a second higher rate.

* * * * *